US006595845B1

(12) United States Patent
Mizuno et al.

(10) Patent No.: US 6,595,845 B1
(45) Date of Patent: Jul. 22, 2003

(54) OUTER-DIAMETER BLADE, INNER-DIAMETER BLADE, CORE DRILL AND PROCESSING MACHINES USING SAME ONES

(75) Inventors: Toru Mizuno, Fukushima-ken (JP); Ikuo Hattori, Mitsukaido (JP); Akihiko Sugama, Koriyama (JP); Toshikatsu Matsuya, Tendo (JP); Yoshiaki Ise, Tendo (JP)

(73) Assignees: Atock Co., Ltd., Ibaraki (JP); Shin-Etsu Quartz Products Co., Ltd., Tokyo (JP); Yamagata Shin-Etsu Quartz Co., Ltd., Yamagata (JP)

( * ) Notice: Subject to any disclaimer, the term of this patent is extended or adjusted under 35 U.S.C. 154(b) by 0 days.

(21) Appl. No.: 09/708,049

(22) Filed: Nov. 8, 2000

Related U.S. Application Data

(62) Division of application No. 09/390,629, filed on Sep. 7, 1999, now Pat. No. 6,203,416.

(30) Foreign Application Priority Data

| | | |
|---|---|---|
| Sep. 10, 1998 | (JP) | 10-256999 |
| Jan. 27, 1999 | (JP) | 11-019096 |
| Feb. 17, 1999 | (JP) | 11-038790 |
| Feb. 25, 1999 | (JP) | 11-047778 |
| May 13, 1999 | (JP) | 11-132956 |
| Jul. 13, 1999 | (JP) | 11-198534 |

(51) Int. Cl.$^7$ .................................... B23F 21/03
(52) U.S. Cl. .................................... 451/548; 125/15
(58) Field of Search .................................... 451/541, 542, 451/543, 544, 545, 546, 547, 548; 125/15, 13.01, 13.02, 12, 18

(56) References Cited

U.S. PATENT DOCUMENTS

| | | | | | |
|---|---|---|---|---|---|
| RE24,562 | E | * | 11/1958 | Hughes | 125/15 |
| 3,491,742 | A | | 1/1970 | Weiss | 125/15 |
| 3,626,921 | A | | 12/1971 | Lane | 125/15 |
| 3,939,612 | A | | 2/1976 | Peterson | 51/293 |
| 4,850,331 | A | | 7/1989 | Balck | 125/15 |
| 4,930,487 | A | * | 6/1990 | Younger | 125/15 |
| 4,962,748 | A | | 10/1990 | Schweickhardt | 125/13.01 |
| 5,133,783 | A | | 7/1992 | Tanabe et al. | 51/295 |
| 5,218,947 | A | | 6/1993 | Ajamian | 125/13.02 |
| 5,218,948 | A | * | 6/1993 | Mazaki | 125/15 |
| 5,465,706 | A | | 11/1995 | Sawluk | 125/15 |
| 5,537,987 | A | * | 7/1996 | Okawauchi | 125/15 |
| 5,603,310 | A | * | 2/1997 | Chiuminatta | 125/15 |
| 6,273,082 | B1 | * | 8/2001 | Tselesin | 125/15 |

OTHER PUBLICATIONS

Notice Requesting Submission of Opinion dated Aug. 23, 2000 (original and english translation).

* cited by examiner

*Primary Examiner*—Derris H. Banks
(74) *Attorney, Agent, or Firm*—Arent Fox Kintner Plotkin & Kahn, PLLC

(57) ABSTRACT

The present invention relates to an outer-diameter blade, an inner-diameter blade and cutting machines which respectively use the outer-diameter blade and the inner-diameter blade for cutting hard material, such as metal, ceramics, semiconductor single crystal, glass, quartz crystal, stone, asphalt or concrete, and a core drill and a core-drill processing machine which drives the core drill for forming a hole in the hard material.

8 Claims, 25 Drawing Sheets

OUTER-DIAMETER BLADE, INNER-DIAMETER BLADE, CORE DRILL AND PROCESSING MACHINES USING SAME ONES

This application is a divisional application filed under 37 CFR §1.53(b) of parent application Ser. No. 09/390,629, filed Sep. 7, 1999, now U.S. Pat. No. 6,203,416.

BACKGROUND OF THE INVENTION

1. Field of the Invention

The present invention relates to an outer-diameter blade, an inner-diameter blade and cutting machines which respectively use the outer-diameter blade and the inner-diameter blade for cutting hard material, such as metal, ceramics, semiconductor single crystal, glass, quartz crystal, stone, asphalt or concrete, and a core drill and a core-drill processing machine which drives the core drill for forming a hole in the hard material.

2. Description of the Related Art

A conventional outer-diameter blade and a cutting machine using the conventional outer-diameter blade will be described with reference to FIGS. 18 to 21.

A conventional outer-diameter blade 10, as shown in FIG. 18, is constructed of: a metal base plate 12 having a disk-like shape, which is rotating at a high speed; and a tip portion 14 formed along the outer peripheral part thereof, in which portion diamond abrasive grains or CBN abrasive grains are fixed to the outer peripheral part by metal bonding, resin bonding or electroplating. A numerical mark 16 indicates a shaft hole which is formed in the central part of the metal base plate 12. A numerical mark 18 indicates a cutting machine and is provided with a rotation drive section 20 which includes drive means such as a motor and a rotary shaft 22 connected to the rotation drive section 20 (FIGS. 19(*a*) and 19(*b*)).

When a to-be-cut object or a workpiece G in a shape, such as a plate, a rod or a tube made of hard material, such as glass, ceramics, semiconductor single crystal, quartz crystal, stone, asphalt or concrete, is cut using a conventional outer-diameter blade, there has arisen a problem, because the cutting progresses in the following way: A shape of the tip portion 14 of the outer-diameter blade 10 is channel-like or of a Greek letter Π in section one end of which has an opening facing the metal base plate 12 and the other end of which is flat (FIG. 18(*c*)) and therefore, as cutting of the to-be-cut object G by the outer-diameter blade 10 progresses, cutting resistance arises between the to-be-cut object G and the outer-diameter blade 10 (FIG. 20(*a*)).

Since the cutting resistance simultaneously acts in two ways: in one way the workpiece G is warped, and in the other way the metal base plate 12 of the outer-diameter blade 10 is bowed, the to-be-cut object G is put into contact with a side surface 12*a* of the metal base plate 12 and as a result, chipping (a phenomenon that cracking or flaking occur on a cutting surface of the to-be-cut object G) occurs (FIG. 20(*b*)).

Besides, a cutting surface M is curved due to bowing (FIG. 21(*b*)) of the metal base plate 12 of the outer-diameter blade 10 taking place during cutting operation and eventually when the cutting is completed, the tip portion of the outer-diameter blade turns aside (FIG. 21(*c*)) and a burr N remains at a cut-off end of the to-be-cut object G (FIG. 21(*d*)).

Then, a conventional inner-diameter blade and a cutting machine using the inner-cutting blade will be described with reference to FIGS. 26 to 28.

A conventional inner-diameter blade 110, as shown in FIGS. 26 to 28, is constructed of: a base plate 114 (for example a thin metal base plate having a doughnut like shape) with a central hole 112 formed in a central part which rotates at a high speed; and a tip portion 116 formed along an inner peripheral part thereof, abrasive grains (cutting grains) of which portion are fixed to the inner peripheral part by metal bonding, resin bonding or electroplating.

In FIG. 27, a numerical mark 120 indicates a conventional cutting machine and the machine 120 is equipped with a rotary shaft 126 which is mounted to the base table 122 in a rotatable manner with a bearing member 124 interposed therebetween. A rotary cylinder 130 is mounted on the top of the rotary shaft 126. The rotary cylinder 130 is constructed of a circular bottom plate 130*a* and a cylindrical side plate 130*b* vertically set on the bottom plate 130*a*.

A grinding liquid waste route 128 is formed lengthwise as a hole through the central part of the rotary shaft 126 and further through the central part of the bottom plate 130*a* of the rotary cylinder 130 and the grinding liquid which is made to flow and falls down on the bottom plate 130*a* during the cutting is discharged through the waste route. An inner-diameter blade 110 of a structure shown in FIGS. 26(*a*) and 26(*b*) is mounted on the upper end of the outer peripheral portion of the cylindrical side plate 130*b* with a mounting plate 132 interposed therebetween.

A numerical mark 134 indicates a motor and a motor pulley 138 is attached to a motor shaft 136. A pulley 140 is mounted in a lengthwise middle part of the rotary shaft 126 in a corresponding manner to the motor pulley 138. A numeral mark 142 indicates a drive belt and the belt is extended between the motor pulley 138 and the pulley 140. When the motor is driven, the motor shaft 136 is rotated, the rotation is transmitted to the rotary shaft 126 through the motor pulley 138, the drive belt 142 and the pulley 140, and the rotary shaft 126 is eventually rotated.

The rotary cylinder 130, the mounting plate 132 and the inner-diameter blade 110 are rotated in company with rotation of the rotary shaft 126. By putting the to-be-cut object G into contact with the tip portion in rotation, the workpiece G is cut by the tip portion 116. Numerical marks 144 and 146 indicate bearings attached to outer side wall part of the rotary shaft 126.

When a to-be-cut object G in a shape, such as a plate, a rod or a tube made of hard material, such as glass, ceramics, semiconductor single crystal, quartz crystal, stone, asphalt or concrete, is cut using a conventional inner-diameter blade while the to-be-cut object G is held by a work holder H, there has arisen a problem, because the cutting progresses in the following way: A cutting resistance arises between the workpiece G and the inner-diameter blade 110 as the cutting progresses. Since the cutting resistance acts so as to bow the inner-diameter blade 110, the to-be-cut object G is put into contact with a side surface of the inner-diameter blade 110, which further causes a mechanical contact resistance.

The cutting resistance and the contact resistance cooperate with each other to an adverse effect, so that the inner-diameter blade 110 is bowed more as shown in FIG. 28(*c*) and as a result, a cutting surface of the to-be-cut object G is curved as observed after the cutting is finished. The inner-diameter blade 110 which has once been bowed in such a way does not restore its original shape and a to-be-cut object G which comes next is always finished in the cutting so as to have a curved cutting surface of the to-be-cut object G due to the existing deformation of the blade.

In a conventional core drill 212, as shown in FIG. 29, which is a tool, a base metal section 216 having a cup-like shape constructed of a disk-like top wall 216*a* and a cylindrical side wall 216*b* is provided on a fore-end of a shank 214 made of steel, which acts as a rotary shaft; a grinding stone portion 218 is mounted on an outer end part of the base metal section 216, whose abrasive grains are fixed to the outer end part of the base metal section 216 by metal bonding, resin bonding or electroplating; and not only are the shank 214, the base metal section 216 and the grinding stone portion 218 rotated by drive means such as a motor, but the grinding stone portion 218 is put into contact with a workpiece W so that the workpiece W can be ground through to form a circle hole in section leaving a cylindrical core therein.

A through-hole 222 along an axis of the shank 214 of the core drill 212 is formed therein in order to supply a grinding liquid 220 to a working area in grinding. For example, when a workpiece W of glass or the like is ground, the grinding liquid 220, which is fed through the through-hole 222, passes through gaps between the surfaces of the outer end face and side surfaces of the grinding stone portion 218, and the workpiece W, during which passage the grinding liquid 220 not only cools the grinding region but washes away grinding powder of the workpiece W produced by grinding and abrasive grains loosed off from the grinding stone portion 218 (hereinafter also simply referred to as workpiece powder and the like) and the grinding liquid 220 is discharged together with the workpiece power. By such an action of the grinding liquid 220, not only is a drilling speed of the core drill 212 increased but a lifetime of the grinding stone portion 218 is extended.

However, when a hole forming is performed in a workpiece W made of glass and the like with a comparatively large thickness using the conventional core drill 212, there has arisen a problem since adverse effects as follows occur: As grinding progresses and a hole depth increases, the grinding liquid 220 receives very large resistance to flow through the gaps between the fore-end part of the grinding stone portion and the working surface of the workpiece W. In such a case, a flow rate of the grinding liquid supplied through the through-hole 222 is rapidly decreased because of limitation on a supply pressure thereof, so that a cooling effect and cleaning action of the grinding liquid 220 cannot be exerted and thereby, powder of glass and loosed-off abrasive grains (workpiece powder and the like) 224 causes loading on working side surfaces 226*a* and 226*b,* inner and outer, of the workpiece W and the surfaces of the inner/outer sides of the grinding stone section 218 of the core drill 212 (FIG. 30). With such loading on the surfaces, a cutting ability of the core drill 212 is decreased and thereby, the core drill 212 quickly decreases its drilling speed.

In order to solve such a problem, there has been adopted the following process, in which drilling is continued till the outer end part of the grinding stone portion 218 progresses down to a depth a little larger than a height of the grinding stone portion 218; after the core drill 212 is temporarily stopped, the core drill 212 is extracted from the workpiece; powder of glass and loosed-off abrasive grains (workpiece powder and the like) 224 loaded on working side surfaces 226*a* and 226*b,* inner and outer, of the workpiece W and the surfaces of the inner/outer sides of the grinding stone portion 218 of the core drill 212 are removed; and then the drilling is restarted. For this reason, there has been arisen another problem, since a drilling time required is longer and thereby a cost is increased.

Furthermore, since the face of the outer end face of the grinding stone portion 218 of the conventional core drill 212 is of a flat surface, stresses arise in the workpiece such as glass across a broad area R confronting the outer end face of the grinding stone portion 218 through which the grinding stone portion 218 passes (hereinafter referred to as pass-through area) on completion of the hole forming (FIG. 31). As a result, there has arisen still another problem in a conventional drilling technique, since the defects such as cracks and indentation caused by chipping are easy to be generated in a broader pass-through area R than a drill diameter, which entails deterioration in quality.

While there have generally been employed an outer-diameter blade, an inner-diameter blade, a core drill which are provided with a tip portion or a grinding stone portion, in which diamond abrasive grains of the highest hardness available for cutting of and hole forming in hard material are used, when a material that has stickiness such as metal is cut, a diamond tip portion and a diamond grinding stone portion get higher in temperature and as a result, the diamond tip portion and the diamond grinding stone portion have chances to burn due to the high temperature. In such cases, there have especially preferably been employed a CBN outer-diameter blade, a CBN inner-diameter blade and a CBN core drill that are respectively provided with CBN tip portions and a CBN grinding stone portion, which are inferior to diamond in hardness but superior to diamond in heat resistance.

CBN is a boron nitride having a sphalerite crystal structure in a cubic system and alternatively called borazon. Since CBN not only is excellent in heat resistance, but also is the second to diamond in hardness, CBN is well used in various kinds of tools and as loose abrasive grains.

SUMMARY OF THE INVENTION

The present inventors have conducted a serious study to solve the problems that the above described conventional outer-diameter blade has had and as a result, have found that when a shape of the outer end face of a tip portion is changed to an angled protrusion instead of a flat surface, cutting resistance is decreased and an apex angle of the angled protrusion at the outer end face of the tip portion is preferably set in the range of 45° to 120°, in which range the cutting resistance is satisfactorily decreased.

The present inventors have further found that by forming abrasive grain layers on a side of a metal base plate of the outer-diameter blade, chipping produced when a workpiece is warped and thereby caused to be in contact with the outer-diameter blade, due to cutting resistance during cutting can be prevented from occurring and besides, the outer-diameter blade can be prevented from being turned aside on completion of the cutting by a curved working surface produced due to bowing of the outer-diameter blade, so that a burr at a cut-off end corner can further be prevented from occurring. The present inventors have completed the present invention on the basis of the above findings.

It is a first object of the present invention to provide an outer-diameter blade and a cutting machine using the same by which cutting resistance during cutting can well be decreased, chipping produced when a workpiece is warped by receiving cutting resistance during cutting and put into contact with the outer-diameter blade can be prevented from occurring and further, phenomena are prevented from occurring that the outer-diameter blade is turned aside and a burr is produced on completion of the cutting.

The present inventors have conducted a serious study to solve the problems that the above described conventional inner-diameter blade has had and as a result, has found that when abrasive grain layers are formed on sides of a hollow base plate of the inner-diameter blade and grinding by the abrasive grain layers is exerted in addition to a cutting action of a tip portion dedicated for cutting in the course of the cutting, not only is cutting resistance between the to-be-cut object and the inner-diameter blade well decreased, but mechanical contact resistance between both is greatly reduced. The present invention has been made being based on the findings.

It is a second object of the present invention to provide an inner-diameter blade and a cutting machine using the same, by which, in cutting operation, cutting resistance between a to-be-cut object and the inner-diameter blade and mechanical contact resistance therebetween can simultaneously be reduced to a great extent and an inconvenience can, as a result, be prevented from occurring that the inner-diameter blade is bowed during the cutting and in turn, a cutting surface of the workpiece is curved.

It is a third object of the present invention, which is directed to solve the above described problems of a conventional core drill, to provide a core drill and a core drill processing machine in which the core drill is driven, by which workpiece powder and the like produced in grinding and loosed-off abrasive grains loaded between the core drill and a workpiece are effectively removed constantly through all the cutting operation and thereby, not only is a cutting time required shortened but neither cracking nor chipping occurs when the core drill pass through the workpiece.

In order to achieve the first object, an outer-diameter blade comprises: a metal base plate having a disk-like shape; a tip portion, which is provided along an outer peripheral part of the metal base plate, and whose abrasive grains are fixed to the outer peripheral part; and an abrasive grain layer, which is formed on a side surface of the metal base plate, whose abrasive grains are fixed on a side surface of the metal base plate inwardly from the tip portion, wherein an outer end face of the tip portion is shaped as an angled protrusion.

It is preferable that a height of the abrasive grain layer in the thickness direction of the metal base plate is lower than that of a side part of the tip portion, that is a thickness of the abrasive grain layer is a little, for example by the order of 0.05 mm, smaller than that of the tip portion, relative to a surface of the metal base plate.

It is preferable that diamond abrasive grains included in the abrasive grain layer are finer in size than those included in the tip portion: for example, abrasive grains finer than #170 or as one exemplary size #200.

The abrasive grain layer may be formed across all a side surface of the metal base plate or on a part thereof. When the abrasive grain layer is formed on a part of a side of the metal base plate, there is no specific limitation on a way of forming the abrasive grain layer, but various ways of forming, such as a spiral, a vortex, a radiating pattern, a multiple concentric circle pattern and a multiple dot scatter pattern can selectively be adopted.

As abrasive grains included in the tip portion, diamond abrasive grains and/or CBN abrasive grains can be employed. The abrasive grain layer is constituted of diamond abrasive grains and/or another type of abrasive grains. As other types of abrasive grains, there can be named: SiC, $Al_2O_3$, $ZrO_2$, $Si_3N_4$, CBN and/or BN.

An apex angle of the angular protrusion at the outer end face of the tip portion is preferably set in the range of 45° to 120°, or more preferably in the range of 60° to 90°.

If the apex angle of the outer end face at the tip portion is less than 45°, cutting resistance is reduced, but friction received by the tip portion is increased and thereby, a lifetime of an outer-diameter blade is shortened corresponding to the increase in the friction, while if the apex angle exceeds 120°, an effect to reduce the cutting resistance is diminished, but a action and an effect of the present invention are still secured in this angle range.

As a hard material that is an object for cutting with the outer-diameter blade, there can be named: metal, glass, ceramics, semiconductor single crystal, quartz crystal, stone, asphalt, concrete and the like. In a more detailed manner of description, various kinds of glass can be named, that is: quartz glass, soda lime glass, borosilicate glass, lead glass and the like.

As ceramics, in a more detailed manner of description, there can be named: SiC rod, alumina rod and the like and as semiconductor single crystal, there can be named: silicon single crystal, gallium arsenide single crystal and the like.

An outer-diameter blade cutting machine comprising an outer-diameter blade described above and a rotation drive section for rotating the outer-diameter blade at a high speed can cut any of to-be-cut objects made of a hard material described above in a state of reduced cutting resistance and thereby, not only can chipping but a burr can be prevented from occurring.

In order to achieve the second object, an inner-diameter blade of the present invention comprises: a hollow base plate having a disk-like shape in which a hollow section is formed; a tip portion, which is provided along an inner peripheral part of the hollow base plate, and whose abrasive grains are fixed to the inner peripheral part; and an abrasive grain layer formed on a side surface of the hollow base plate, whose abrasive grains are fixed to a side surface of the hollow base plate.

It is preferable that a height of the abrasive grain layer in the thickness direction of the metal base plate is lower than that of a side part of the tip portion, that is a thickness of the abrasive grain layer is a little, for example by the order of 0.05 mm, smaller than that of the tip portion, relative to a surface of the metal base plate.

It is preferable that diamond abrasive grains included in the abrasive grain layer are finer in size than those included in the tip portion: for example, abrasive grains finer than #170 or as one exemplary size #200.

The abrasive grain layer may be formed across all a side surface of the metal base plate or on a part thereof. When the abrasive grain layer is formed on a part of a side of the metal base plate, there is no specific limitation on a way of forming the abrasive grain layer, but various ways of forming, such as a spiral, a vortex, a radiating pattern, a multiple concentric circle pattern and a multiple dot scatter pattern can selectively be adopted.

As abrasive grains included in the tip portion, diamond abrasive grains and/or CBN abrasive grains can be employed. The abrasive grain layer is constituted of diamond abrasive grains and/or another type of abrasive grains. As other types of abrasive grains, there can be named: SiC, $Al_2O_3$, $ZrO_2$, $Si_3N_4$, CBN and/or BN.

The outer end face of a tip portion is preferably shaped as an angled protrusion. An apex angle of the angular protrusion at the outer end face of the tip portion is preferably set in the range of 45° to 120°, or more preferably in the range of 60° to 90°.

As a hard material that is an object for cutting with the inner-diameter blade, there can be named similar material of those in the case of the outer-diameter blade described above.

An inner-diameter blade cutting machine comprising an inner-diameter blade described above and a rotation drive section for rotating the inner-diameter blade at a high speed can cut any of to-be-cut objects made of a hard material described above in a state of reduced cutting resistance and thereby, not only can bending of the inner-diameter blade but a curved cutting surface of the to-be-cut object can be prevented from occurring.

In order to achieve the third object, a core drill of the present invention comprises: a shank; a base metal section having a cup-like shape constructed of a disk-like top wall and a cylindrical side wall provided on a fore-end of the shank; a grinding stone portion mounted on an outer end part of the base metal section, whose abrasive grains are fixed to the outer end part of the base metal section; and abrasive grain layers formed on inner/outer side surfaces of the cylindrical side wall of the base metal section, whose abrasive grains are fixed to the inner/outer side surfaces of the cylindrical side wall thereof, wherein the grinding stone potion is put into contact with a workpiece while rotating and thereby the workpiece is ground through to form a circle hole in section leaving a cylindrical core therein.

As abrasive grains included in the abrasive layers, abrasive grains finer in size than those included in the grinding stone portion are preferably employed.

There is no specific limitation on a pattern of the abrasive grain layer, but a spiral pattern is preferable. By forming the pattern of the abrasive grain layer, grinding powder of the workpiece is further pulverized into finer particles, the finer grinding powder is thus discharged through gaps between the core drill and the workpiece and a supply/discharge amount of grinding liquid is sufficiently secured, which enables efficient grinding to be realized.

A shape of the outer end face of the grinding stone portion is formed so as to be of an angled protrusion and thereby, defects caused by cracking and chipping and the like which are produced when the core drill passes through the workpiece can be drastically decreased. An apex angle of the angled protrusion at the outer end face of the grinding stone portion is preferably set in the range of 45° to 120°.

As abrasive grains included in the grinding stone portion, diamond abrasive grains and/or CBN abrasive grains can be employed. The abrasive grain layer is constituted of diamond abrasive grains and/or another type of abrasive grains. As other types of abrasive grains, there can be named: SiC, $Al_2O_3$, $ZrO_2$, $Si_3N_4$, CBN and/or BN.

A core drill processing machine of the present invention comprises: (a) a body of a core drill processing machine including a work table on which a workpiece is placed, and a rotary shaft, which is disposed above the work table, and which can be moved toward or away from the work table while freely rotating relative to the work table; and (b) a core drill which can be mounted on the rotary shaft.

As the body of the core drill processing machine, a construction can be adopted which comprises: a frame; a work table, which is placed at the central part of an upper surface of the frame, and on which a workpiece is disposed, a support which is disposed at the peripheral part of the frame and a rotary shaft which is freely moved upward or downward and freely rotated while being held by the support.

DETAILED DESCRIPTION OF THE PREFERRED EMBODIMENTS

Figure 18A:
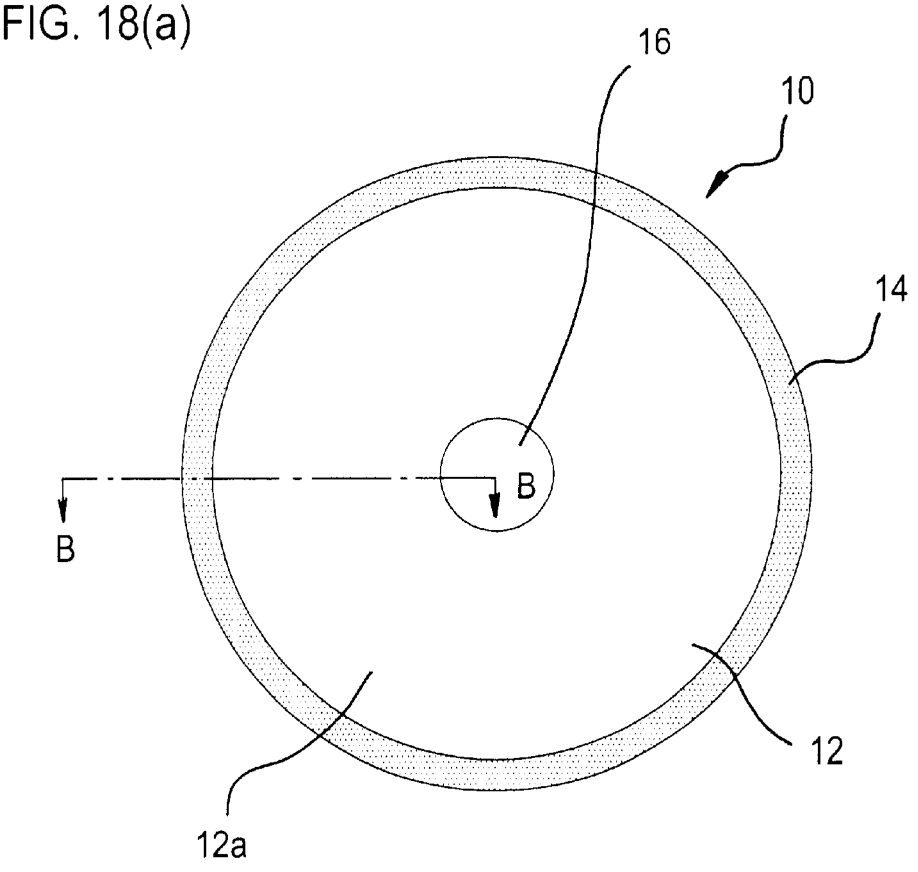
FIGS. 18(*a*), 18(*b*) and 18(*c*) are views showing one example of a conventional outer-diameter blade, FIG. 18(*a*) is a front view of the conventional outer-diameter blade, FIG. 18(*b*) is a sectional view taken on line B—B of FIG. 18(*a*) and FIG. 18(*c*) is a view in outline illustrating of a tip portion.
Figure 18B:
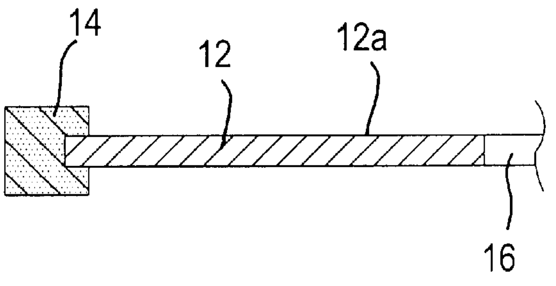
Figure 18C:
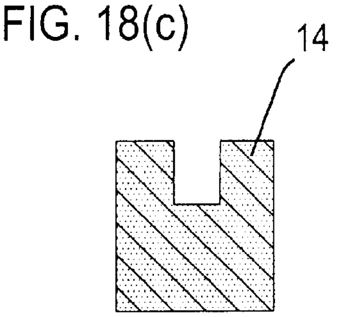
Figure 19A:
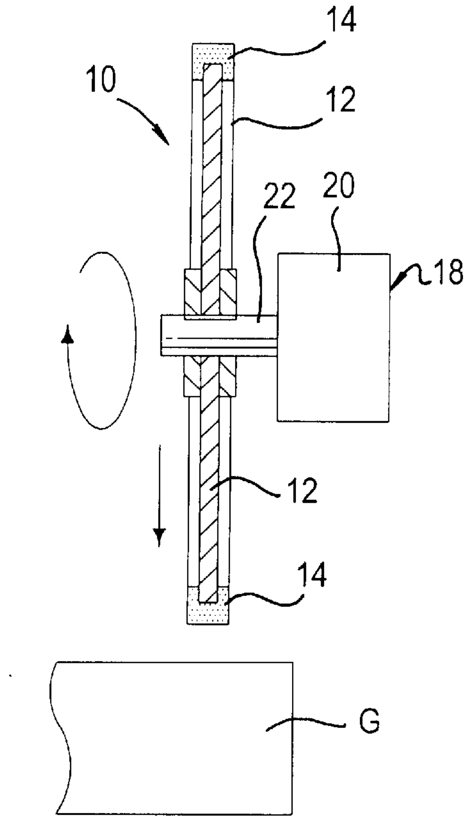
FIGS. 19(*a*) and 19(*b*) are partial sectional views illustrating a cutting machine mounted with a conventional outer-diameter blade, FIG. 19(*a*) is a view showing a state before a to-be-cut object is cut and FIG. 19(*b*) is a view showing a state during cutting of the to-be-cut object.
Figure 19B:
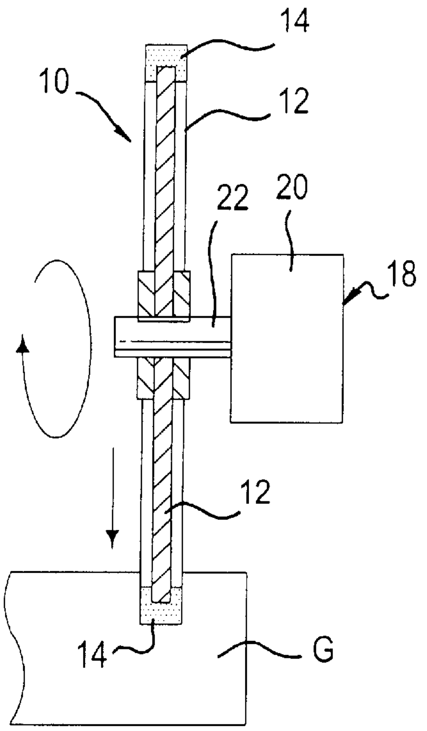
Figure 20A:
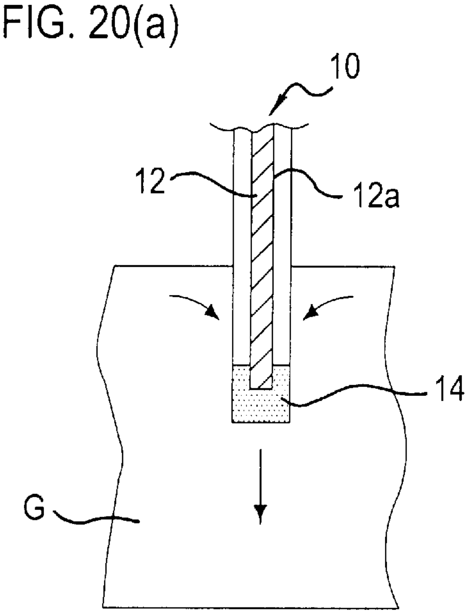
FIGS. 20(*a*) and 20(*b*) are partial sectional views showing states during cutting of the to-be-cut object by the conventional outer-diameter blade, FIG. 20(*a*) is a view showing a state of stresses which the to-be-cut object receives and FIG. 20(*b*) is a view showing a state in which the to-be-cut object is put into contact with both sides of a metal base plate of the outer-diameter blade.
Figure 20B:
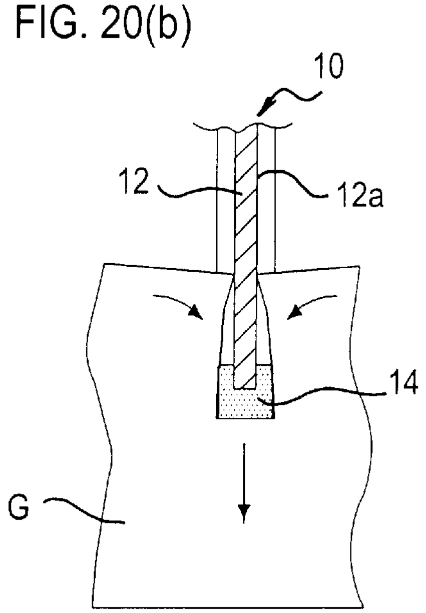
Figure 21A:
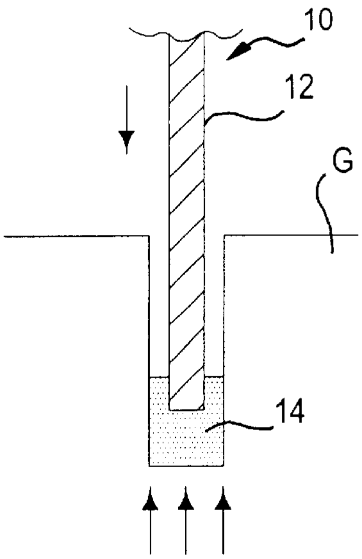
FIGS. 21(*a*), 21(*b*), 21(*c*) and 21(*d*) are views showing states during cutting of the to-be-cut object by a conventional outer-diameter blade, FIG. 21(*a*) is a view showing a state in which cutting resistance is large, FIG. 21(*b*) is a view showing a state in which the outer-diameter blade is bowed and a curved cutting surface is produced, FIG. 21(*c*) is a view showing a state when cutting of the to-be-cut object is finished and FIG. 21(*d*) is a view showing a state in which a burr has been generated on a cutting surface of the to-be-cut object, as observed after the cutting is finished.
Figure 21B:
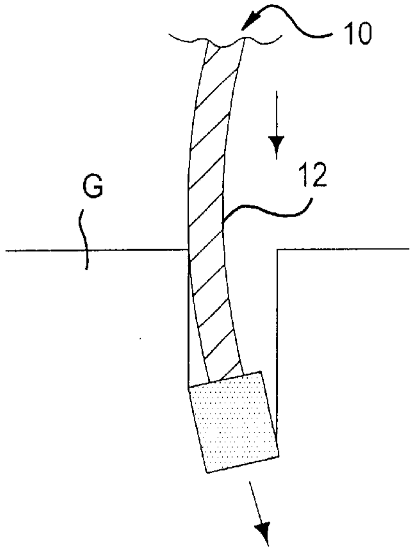
Figure 21C:
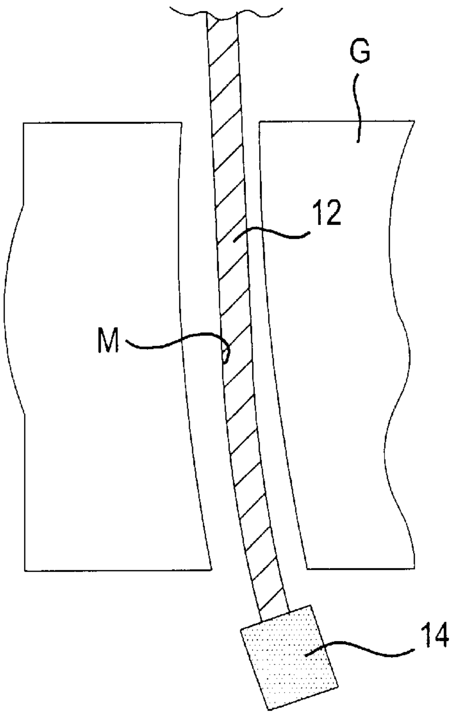
Figure 21D:
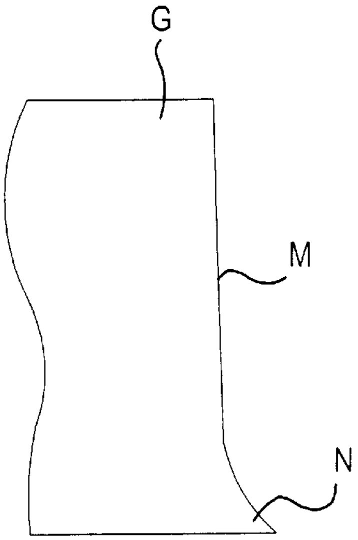

Below, description will be made of an embodiment of an outer-diameter blade of the present invention with reference to FIGS. 1 to 4 of the accompanying drawings. In FIGS. 1 to 4, the same members as or similar members to those of FIGS. 18(*a*), 18(*b*) and 18(*c*) to FIGS. 21(*a*), 20(*b*), 20(*c*) and 20(*d*) are sometimes indicated by the same reference marks.

Figure 1A:
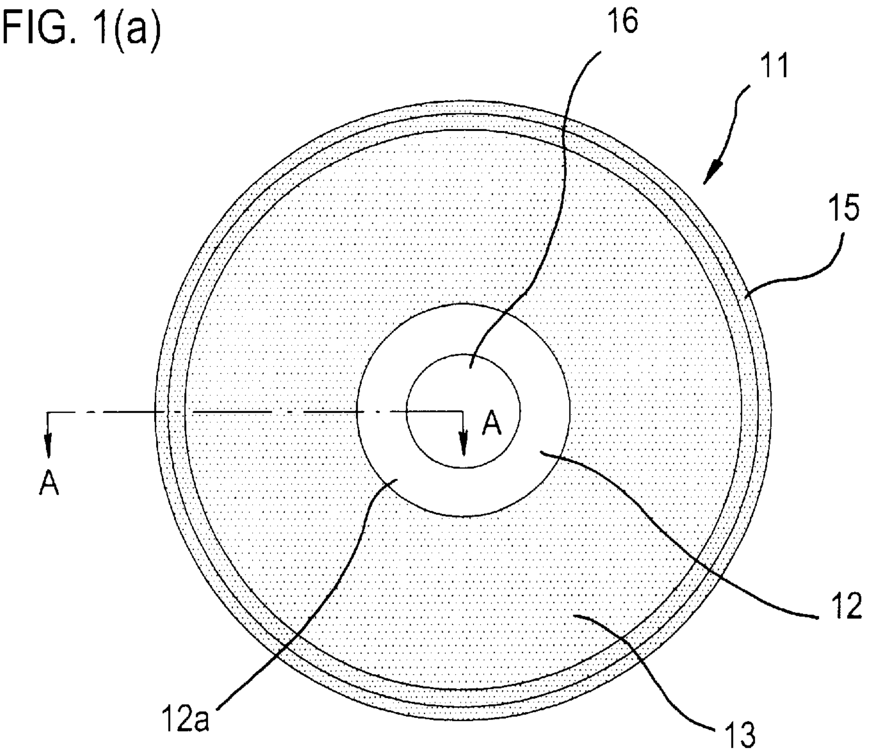
FIGS. 1(*a*), 1(*b*) and 1(*c*) are views showing one embodiment of an outer-diameter blade of the present invention, FIG. 1(*a*) is a front view of the outer-diameter blade, FIG. 1(*b*) is a sectional view taken on line A—A of FIG. 1(*a*) and FIG. 1(*c*) is a side view in outline illustrating a tip portion.
Figure 1B:
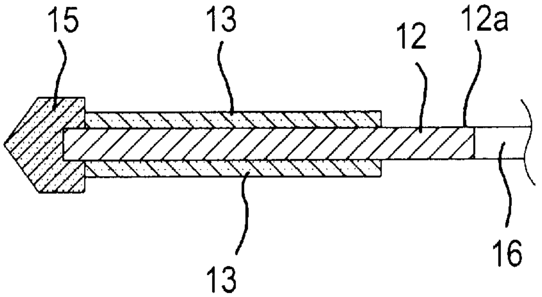
Figure 1C:
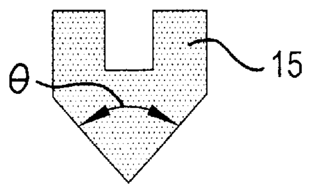
Figure 2A:
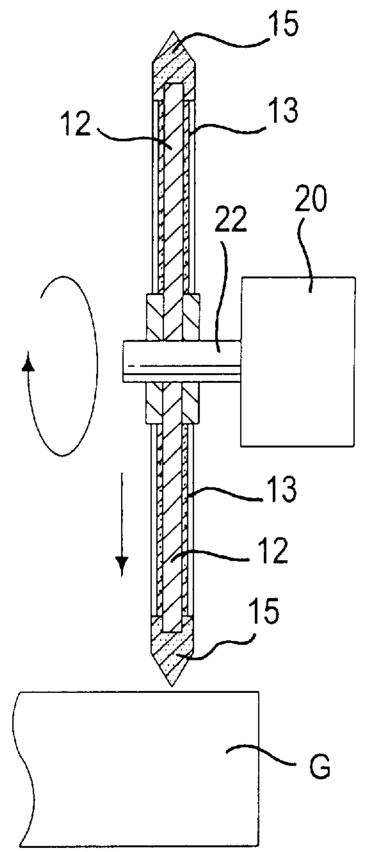
FIGS. 2(*a*) and 2(*b*) are partially sectional side views illustrating a cutting machine mounted with an outer-diameter blade of the present invention, FIG. 2(*a*) is a view showing a state before cutting a to-be-cut object and FIG. 2(*b*) is a view showing a state during cutting of the to-be-cut object.
Figure 2B:
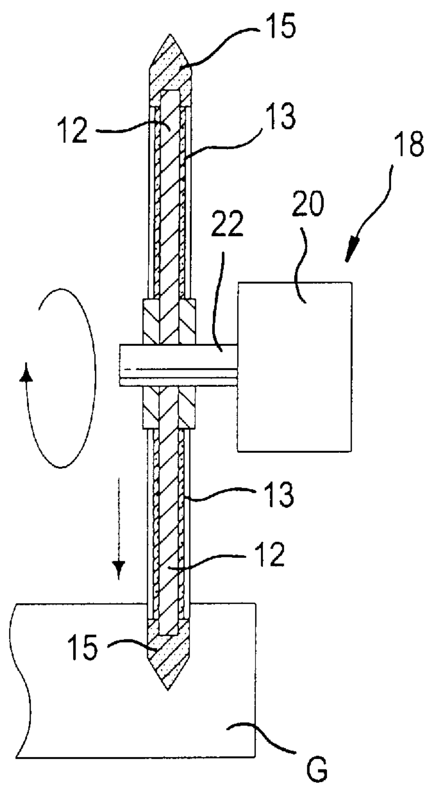
Figure 3A:
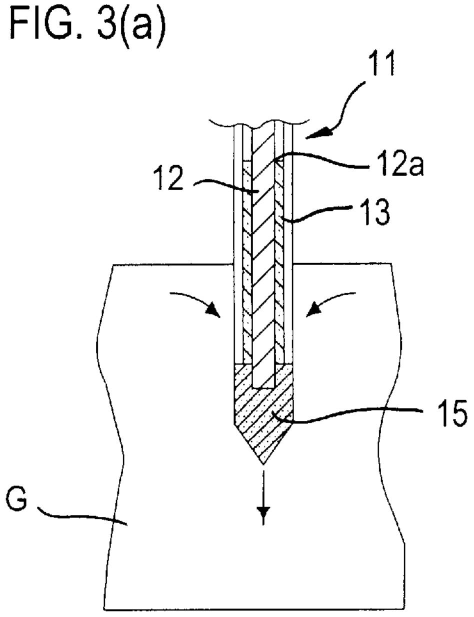
FIGS. 3(*a*) and 3(*b*) are views showing states of a to-be-cut object during cutting by an outer-diameter blade of the present invention, FIG. 3(*a*) is a view showing a state of stresses which a workpiece receives and FIG. 3(*b*) is a view showing a state in which a to-be-cut object is put into contact with both sides of a metal base plate of the outer-diameter blade and the to-be-cut object is ground by abrasive grain layers.
Figure 3B:
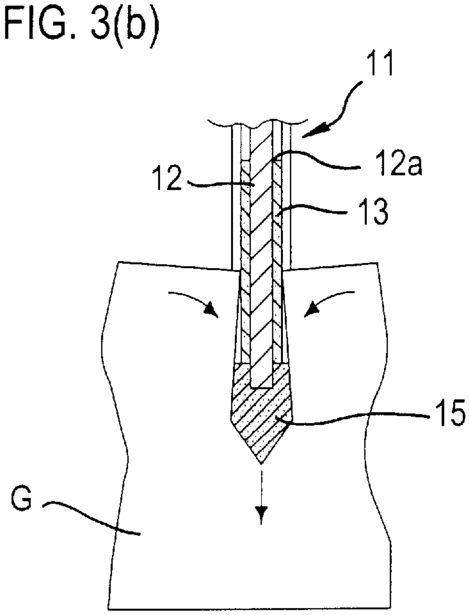

In FIG. 1, an outer-diameter blade 11 of the present invention, as in a conventional way, is constructed of: a metal base plate 12 having a disk-like shape, which is rotating at a high speed; and a tip portion 15 formed along the outer peripheral part thereof, whose abrasive grains are fixed to the outer peripheral part by metal bonding, resin bonding or electroplating. A numerical mark 16 indicates a shaft hole which is formed in the central part of the metal base plate 12. A numerical mark 18 indicates an outer-diameter blade cutting machine and, similar to conventional one, is provided with a rotation drive section 20 and a rotary shaft 22 (FIGS. 2(*a*) and 2(*b*)).

Figure 4A:
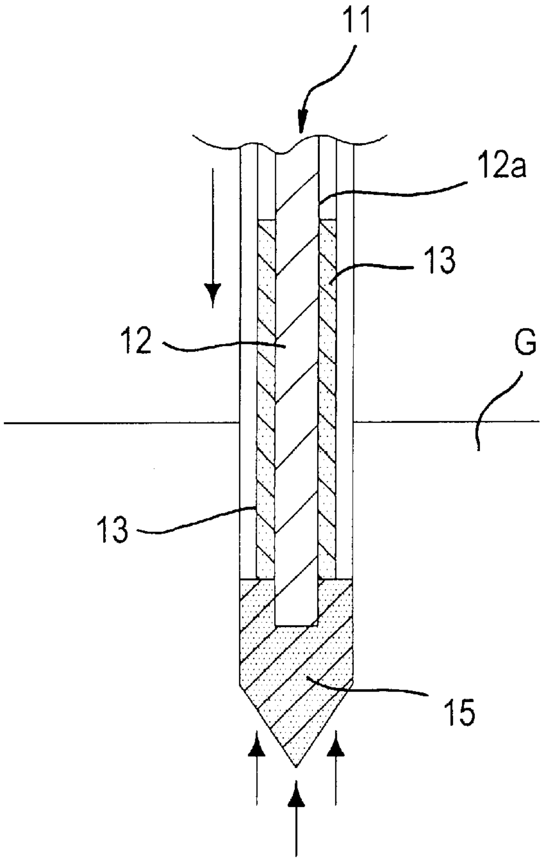
FIGS. 4(*a*), 4(*b*) and 4(*c*) are partially enlarged sectional views illustrating states of a to-be-cut object during cutting by an outer-diameter blade of the present invention, FIG. 4(*a*) is a view showing a state in which cutting resistance is small, FIG. 4(*b*) is a view showing a state in which an outer-diameter blade is not bowed, a cutting surface is not curved and therefore, no phenomenon arises that the outer-diameter blade is turned aside and FIG. 4(*c*) is a view showing a state in which no burr is generated on a cutting surface of the to-be-cut object, which is observed after the cutting is finished.
Figure 4B:
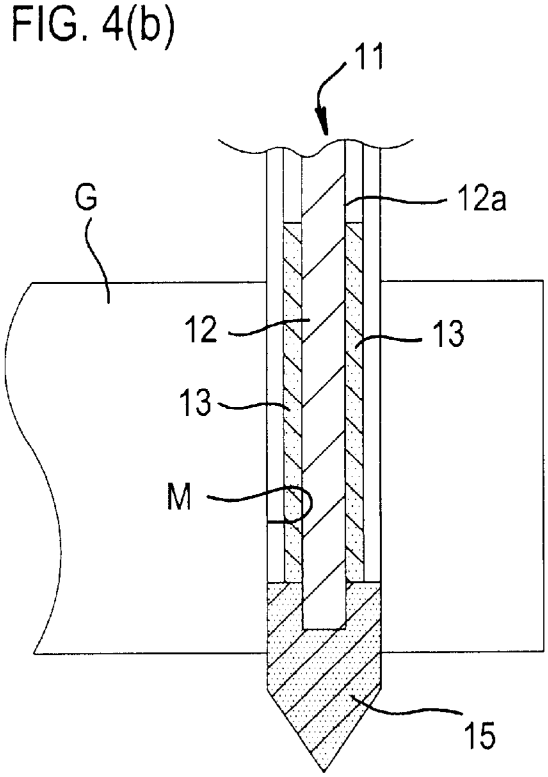
Figure 4C:
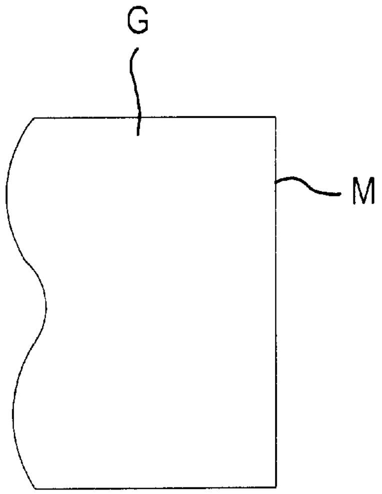

A first feature of an outer-diameter blade 11 of the present invention is that as a sectional shape of the tip portion 15, as shown in FIG. 1(*c*), an outer end face is constituted of an angular protrusion of an apex angle θ. With this shape, cutting resistance is reduced, as shown in FIG. 4(*a*), compared with a case of a conventional flat fore-end shape.

An apex angle of the angled protrusion of the fore-end face of the tip portion 15 is preferably set in the range of 45° to 120°. If the apex angle is less than 45°, cutting resistance is smaller, but friction by the tip portion 15 increases, which causes a lifetime of the outer-diameter blade 11 to be reduced corresponding to increase in the friction. On the other hand, if the apex angle exceeds 120°, the cutting resistance decreases corresponding to increase in the apex angle, but the action and effect of the present invention is still exerted and achieved, as in the case of the apex angle in the specified range.

The apex angle is more preferably set in the range of 60° to 90°. In the mean time, in the example shown in the figure, a case of θ=90° is shown as a preferred example.

A second feature of an outer-diameter blade of the present invention, as shown in FIGS. 1(*a*) and 1(*b*), is that abrasive layers 13 are formed on side surfaces 12*a* of the metal base plate 12 of the outer-diameter blade 11.

By providing the abrasive grain layer 13, when a to-be-cut object G is put into contact with the outer-diameter blade 11 during the processing due to warpage of the to-be-cut object G, chipping can be prevented from occurring, which a conventional outer-diameter blade has been unable to avoid.

Besides, since both side surfaces 12*a* of the metal base plates of the outer-diameter blade 11 are covered by abrasive grains to form a abrasive layer 13, the outer-diameter blade 11 is reinforced by the abrasive layer 13 and thereby, there arises no chance for the outer-diameter blade 11 is bowed during cutting. Hence, a cutting surface is not formed to be curved, no phenomenon takes place that the outer-diameter blade 11 is turned aside when the cutting is finished and in addition, a burr is perfectly prevented from occurring (FIGS. 4(*a*), 4(*b*) and 4(*c*)).

A size of abrasive grains that are used in the tip portion of an outer-diameter blade 11 of the present invention may be of the order of #170 as conventional. On the hand, a size of abrasive grains of the abrasive grain layer 13 is preferably finer than abrasive grains of the tip portion 15, for example of the order #200.

It is preferable that a height of the abrasive grain layer 13 in the thickness direction of the metal base plate is lower than that of a side part of the tip portion 15. If the height of the abrasive grain layer 13 is higher than that of the side part of the tip portion 15, there arises a disadvantage to make a cutting operation itself difficult.

The abrasive grain layer 13 may be formed across either all side surfaces of the metal base plate 12 or on a part thereof. When the abrasive grain layer 13 is formed on parts of the respective sides of the metal base plate 12, there is no specific limitation on a way of forming the abrasive grain layer, but various ways of forming, such as a spiral, a vortex, a radiating pattern, a multiple concentric circle pattern and a multiple dot scatter pattern can selectively be adopted.

As a hard material that is an object for cutting with the outer-diameter blade 11, there can be named: metal, glass, ceramics, semiconductor single crystal, quartz crystal, stone, asphalt, concrete and the like.

As metals, in a detailed manner of description, there can be named: magnetic materials such as a stainless steel rod, a stainless steel pipe and ferrite, as semiconductor single crystal, there can be named: silicon single crystal, gallium arsenide single crystal and the like, as ceramics, there can be named: rods, pipes, blocks, plates and the like of SiC, alumina and as glass, there can be named: quartz glass, soda lime glass, borosilicate glass, lead glass and the like.

Figure 12:
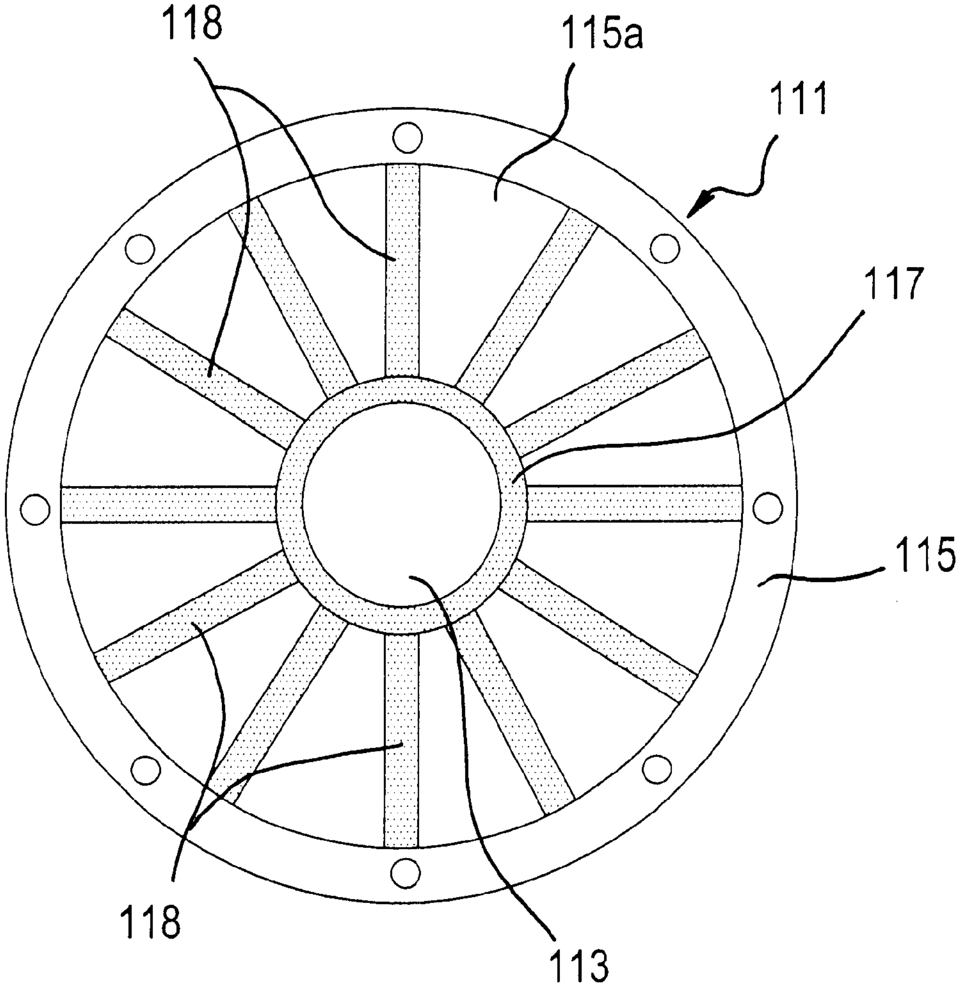
FIG. 12 is a front view showing a sixth embodiment of an inner-diameter of the present invention.
Figure 13A:
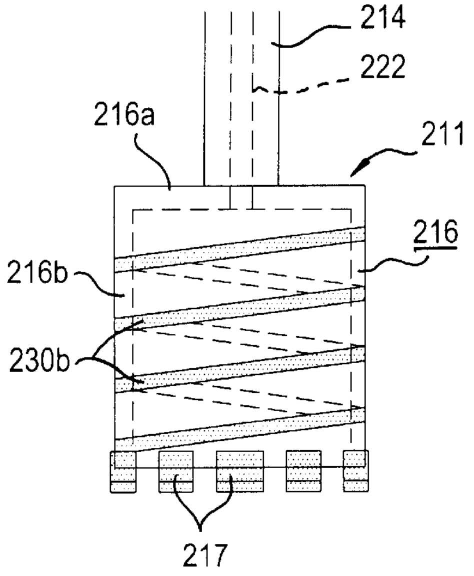
FIGS. 13(*a*), 13(*b*), 13(*c*) and 13(*d*) are views showing one embodiment of a core drill of the present invention, FIG. 13(*a*) is a front view, FIG. 13(*b*) is vertical sectional view, FIG. 13(*c*) is a bottom view and FIG. 13(*d*) is an enlarged view in outline showing a grinding stone portion.
Figure 13B:
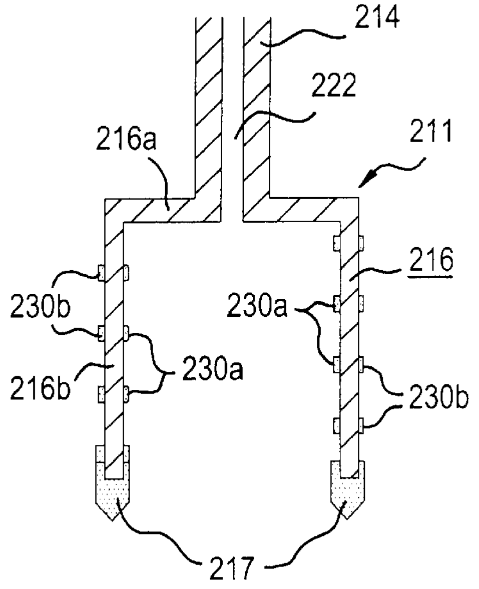
Figure 13C:
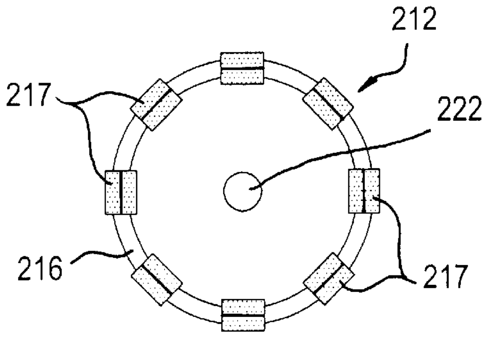
Figure 13D:
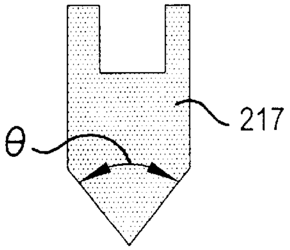

Then, description will be made of embodiments of an inner-diameter blade of the present invention with reference to FIGS. 5(*a*) and 5(*b*) to FIG. 12 of the accompanying drawings.

Figure 5A:
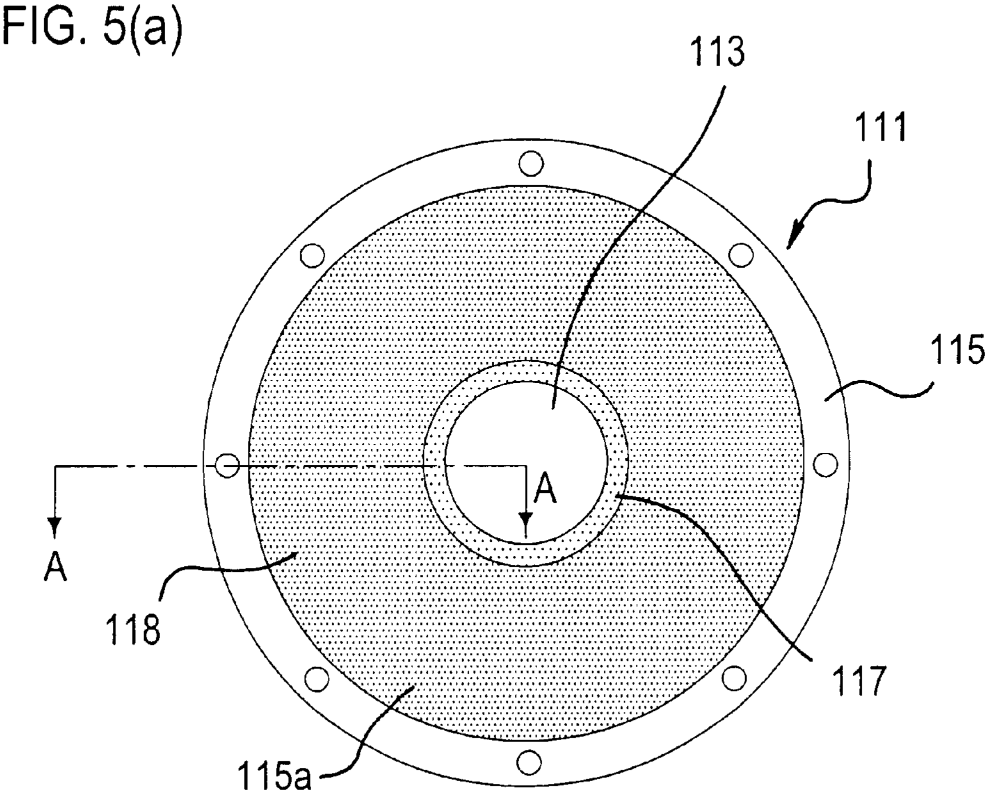
FIGS. 5(*a*) and 5(*b*) are views showing a first embodiment of an inner-diameter blade of the present invention, FIG. 5(*a*) is a front view of the inner-diameter blade of the present invention and FIG. 5(*b*) is a sectional view taken on line A—A of FIG. 5(*a*).
Figure 5B:
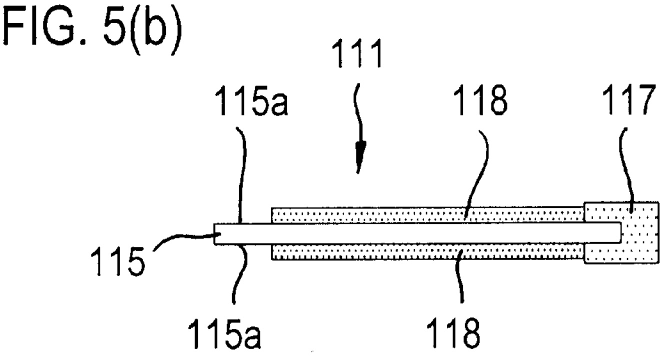
Figure 7A:
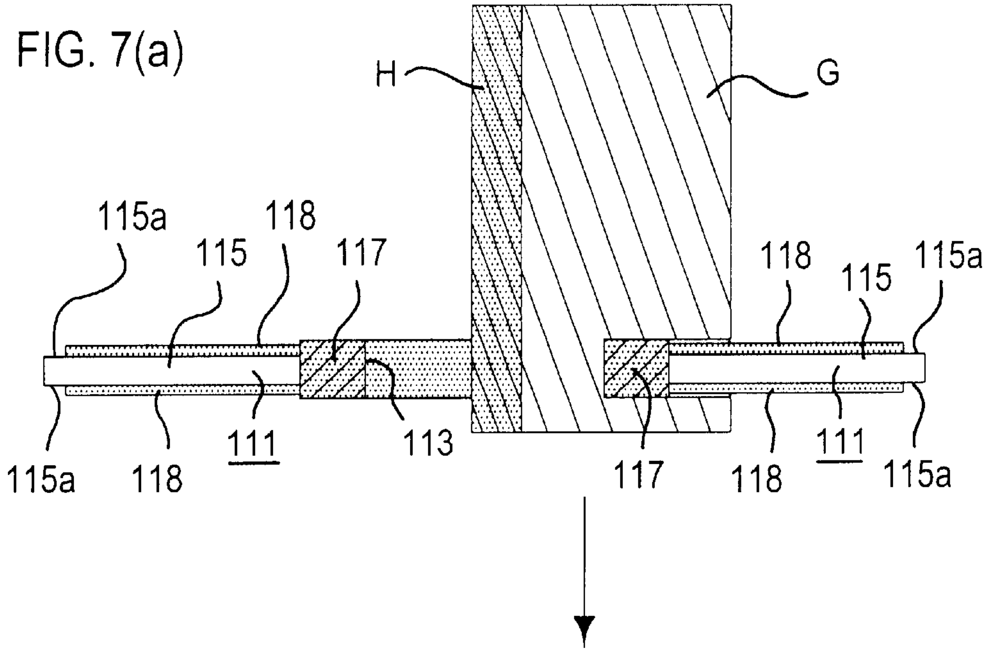
FIGS. 7(*a*), 7(*b*) and 7(*c*) are partially sectional views illustrating a cutting machine mounted with an inner-diameter blade of the present invention, FIG. 7(*a*) is a view showing a state in which a to-be-cut object is cut, FIG. 7(*b*) is a view showing a state when cutting of the to-be-cut object is finished and FIG. 7(*c*) is a view showing a state of a part of the inner-diameter blade after the cutting is finished.
Figure 7B:
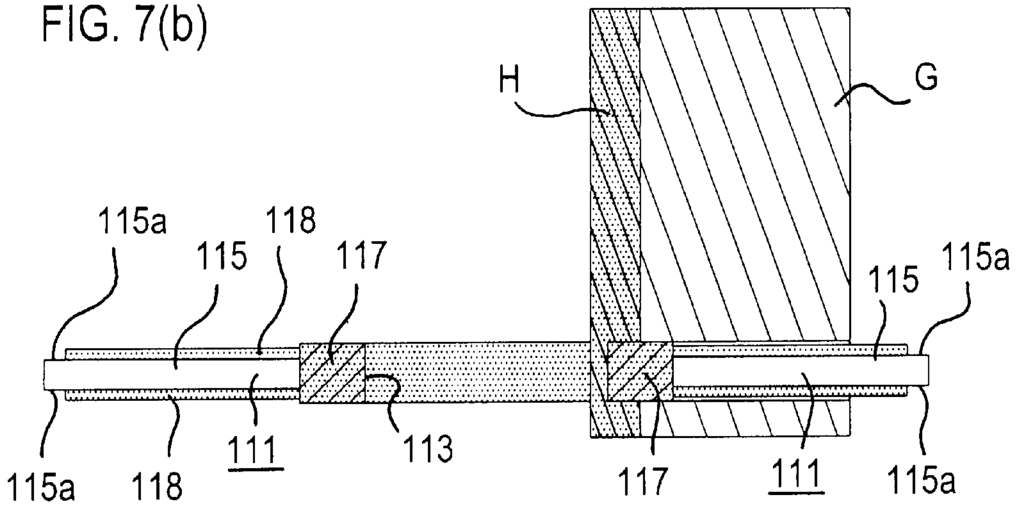
Figure 7C:
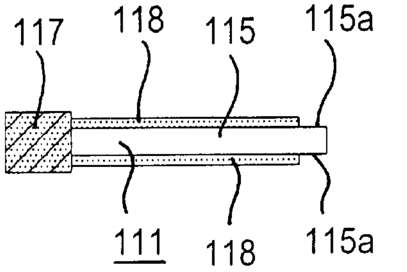

An inner-diameter blade 111 of the present invention, as shown in FIGS. 5(*a*) and 5(*b*) to FIGS. 7(*a*), 7(*b*) and 7(*c*), is constructed of: a base plate 115 (for example a thin metal base plate having a doughnut like shape, of a thickness of about 100 to 200 μm, for example) with a central hole 113 formed in a central part which rotates at a high speed; and a tip portion 117 formed along an inner peripheral part thereof, abrasive grains (cutting abrasive grains) of which portion are fixed to the inner peripheral part by metal bonding, resin bonding or electroplating.

Figure 6:
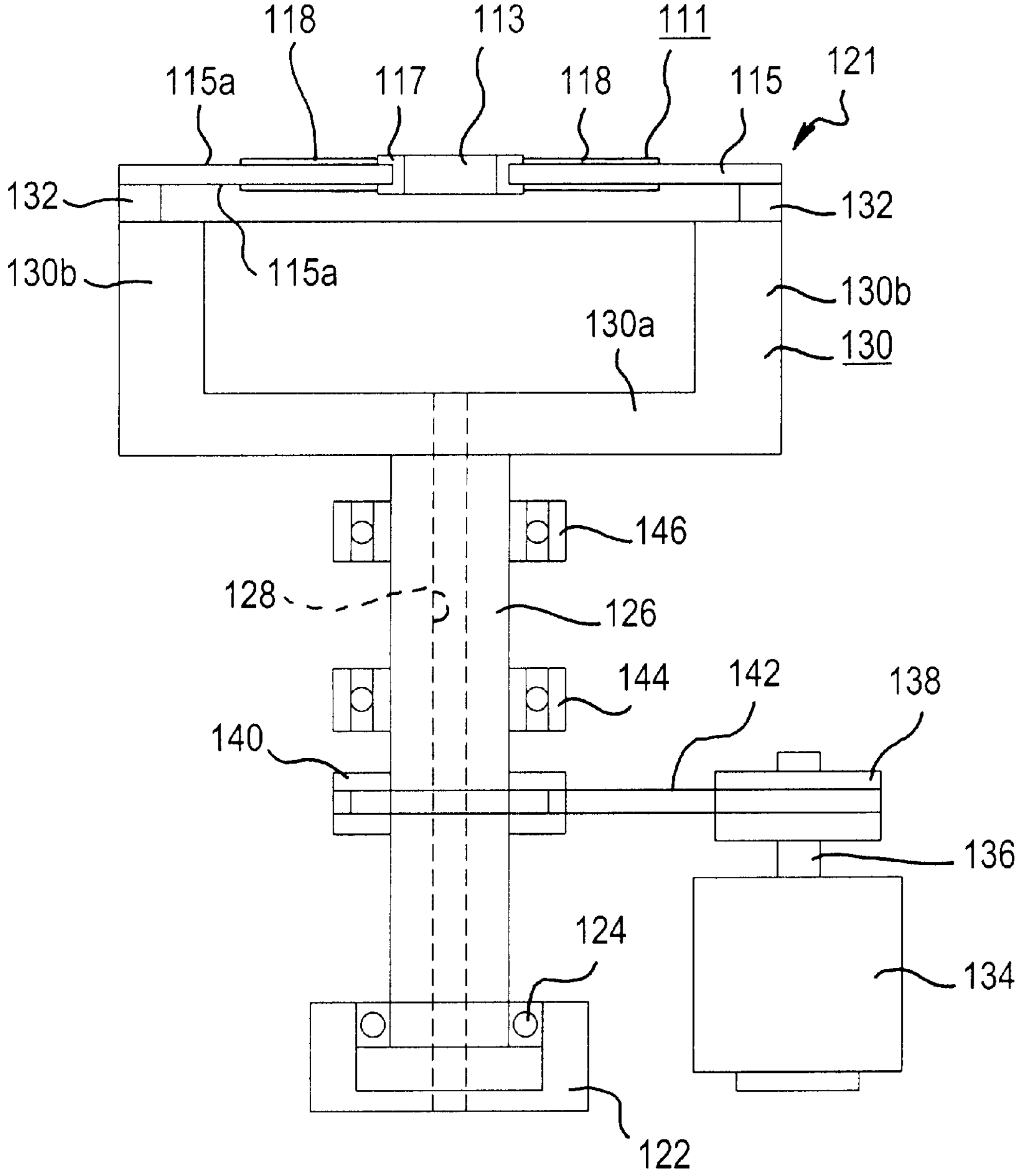
FIG. 6 is a side view in outline illustrating one example of a cutting machine mounted with an inner-diameter blade of the present invention.
Figure 25:
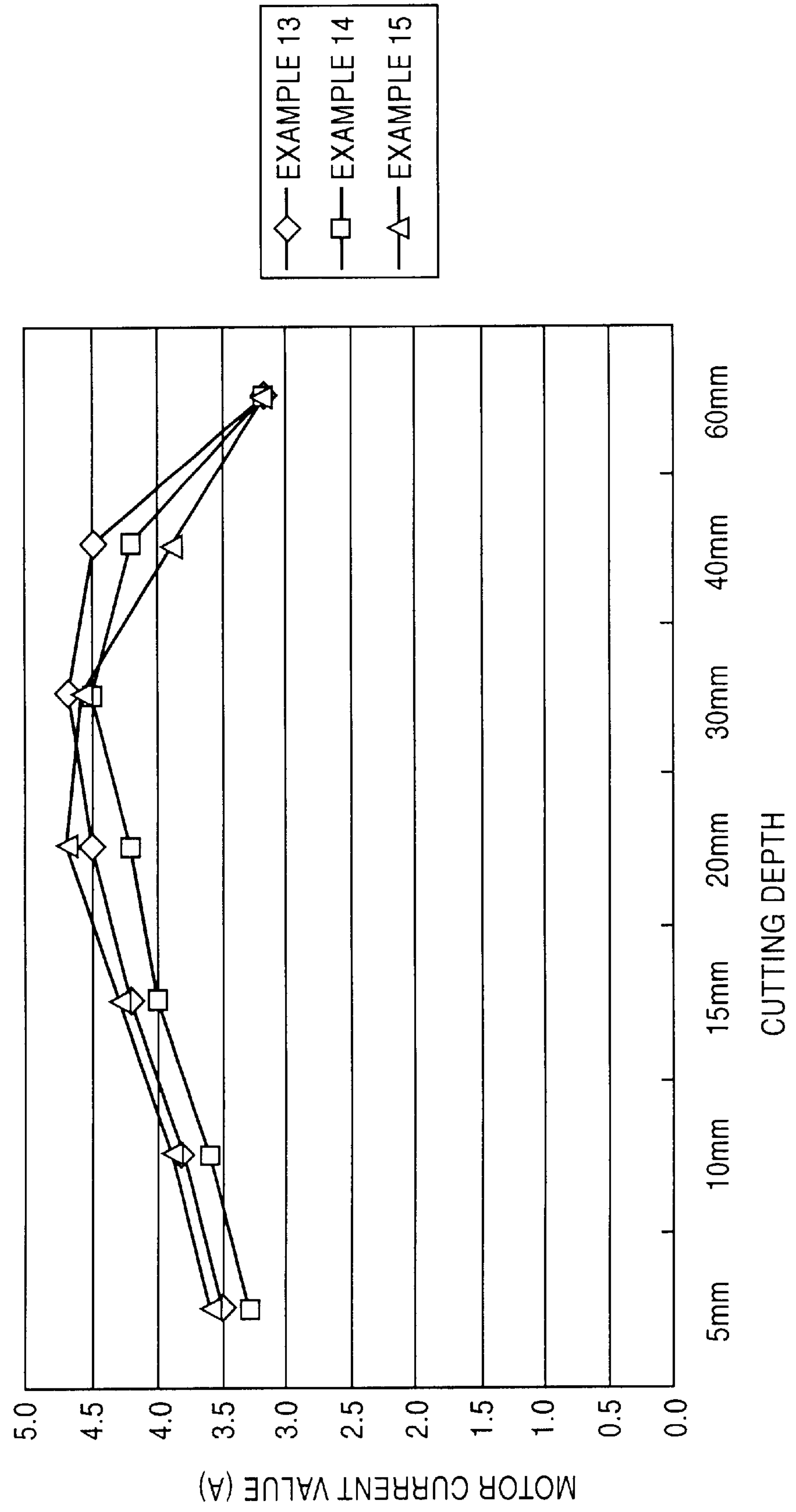
FIG. 25 is a graph showing a change in current a motor for rotation of a CBN blade during cutting in Examples 13 to 15.
Figure 26A:
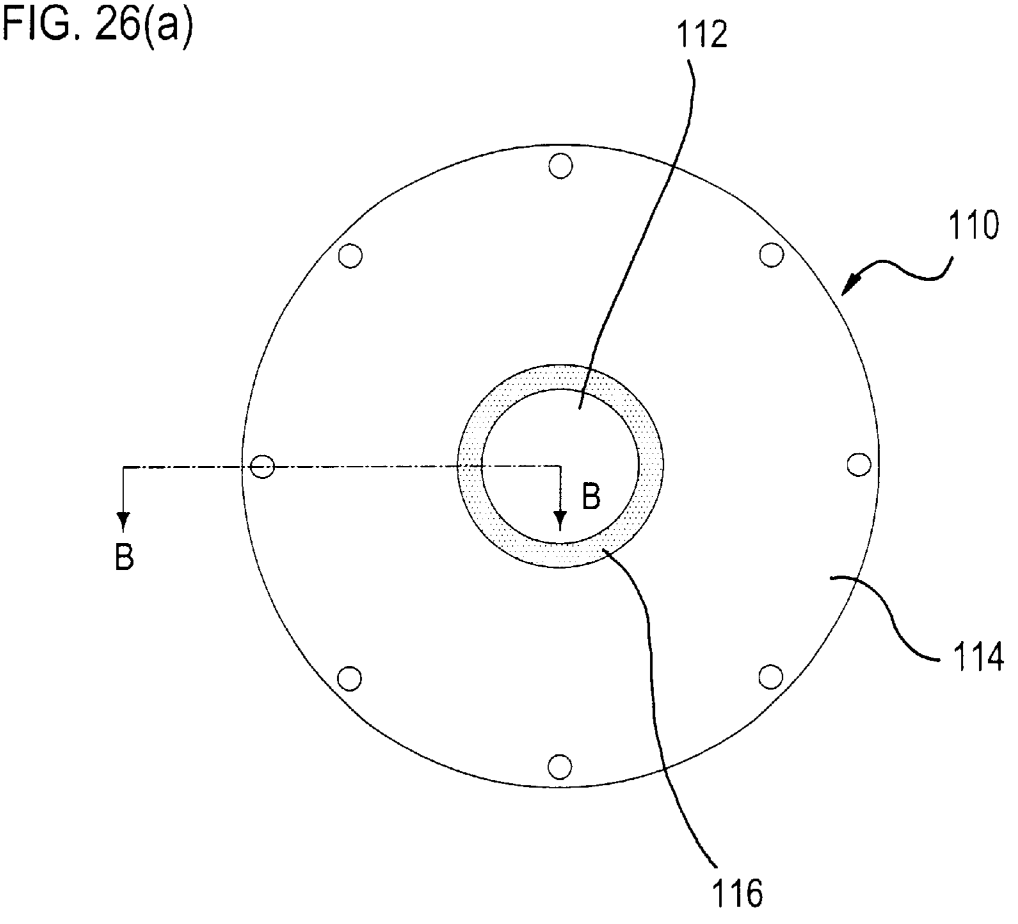
FIGS. 26(*a*) and 26(*b*) are views showing one example of a conventional inner-diameter blade, FIG. 26(*a*) is a front view of the conventional inner-diameter blade and FIG. 26(*b*) is a sectional view taken on line B—B of FIG. 26(*a*)
Figure 26B:
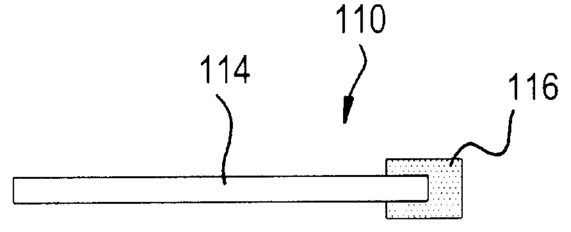
Figure 27:
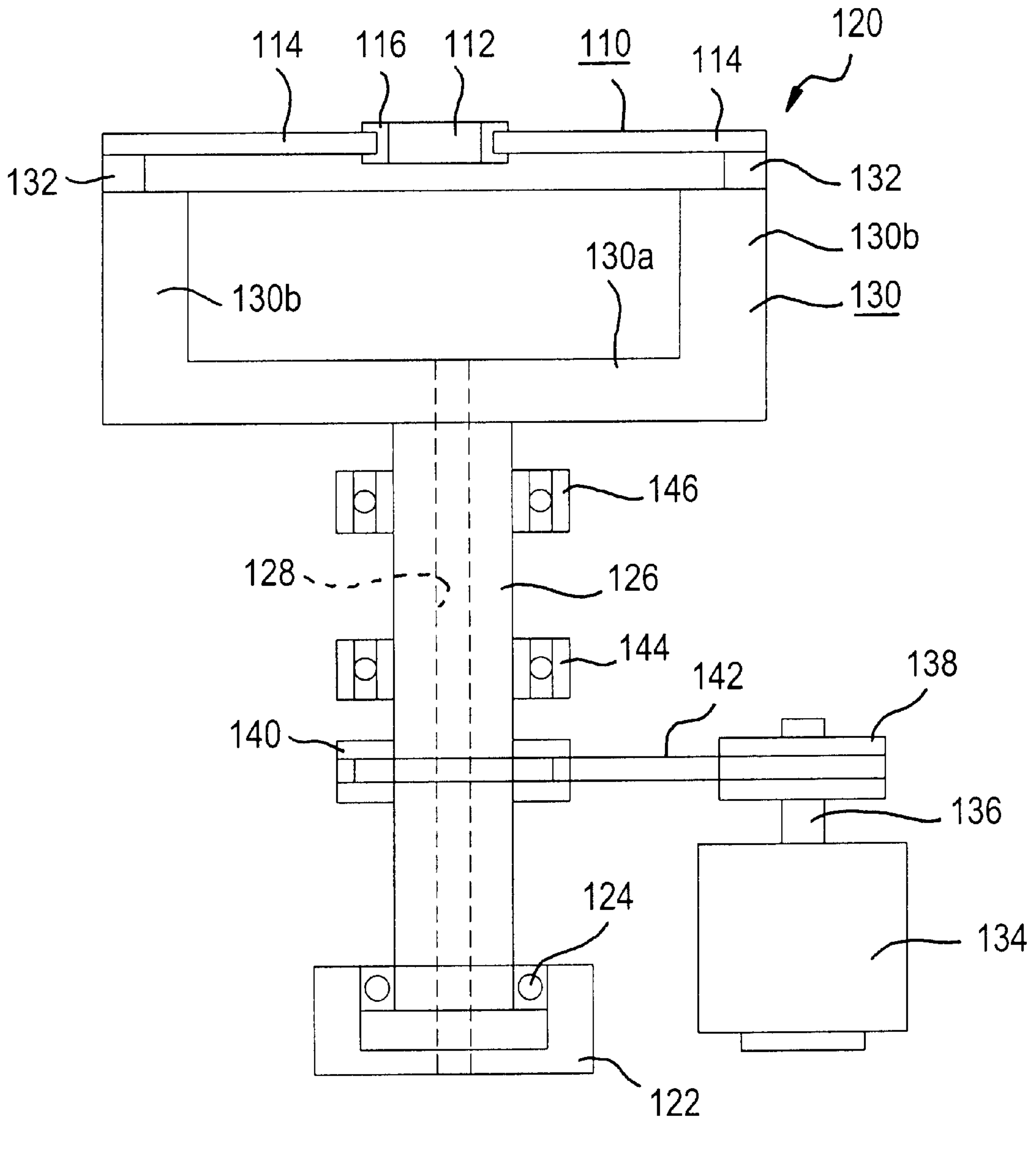
FIG. 27 is a side view in outline showing one example of a cutting machine mounted with a conventional inner-diameter blade.
Figure 28A:
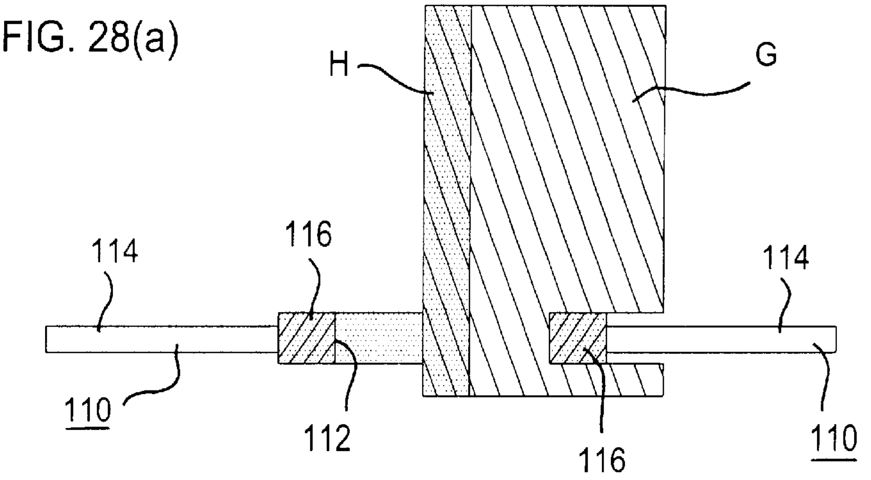
FIGS. 28(*a*), 28(*b*) and 28(*c*) are partial sectional views illustrating a conventional cutting machine mounted with a conventional inner-diameter blade, FIG. 28(*a*) is a view showing a state in which a workpiece is cut, FIG. 28(*b*) is a view showing a state when cutting of the workpiece is finished and FIG. 28(*c*) is a view showing a state of a part of the inner-diameter blade, as observed after the cutting is finished.
Figure 28B:
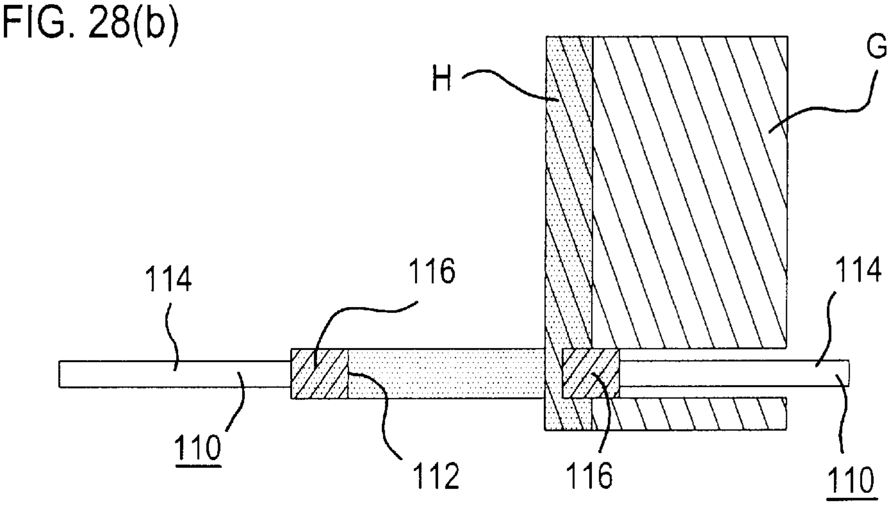
Figure 28C:
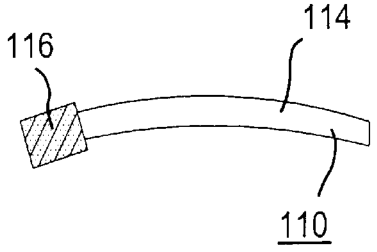

In FIG. 6, a numerical mark 121 indicates an inner-diameter blade cutting machine of the present invention and since the machine has the same structure as that of the conventional cutting machine 120 shown in FIG. 25 with the exception that the inner-diameter blade 111 of the present invention is mounted thereon, second description relating to the machine is not given. As in the case of FIG. 25, the inner-diameter blade 111 is rotated by driving a motor 134 and a to-be-cut object G is put into contact with the tip portion 117 in rotation and thereby, the to-be-cut object G is cut by the tip portion 117.

A feature of an inner-diameter blade 111 of the present invention, as well shown in FIGS. 5(*a*) and 5(*b*), abrasive grains (grinding abrasive grains) are fixed on side surfaces 115*a* of the base plate 115 of the inner-diameter blade 111 by metal boding, resin bonding, electroplating or the like to form abrasive grain layers 118.

By the abrasive grain layers thus provided, when the inner-diameter blade 111 is bowed by receiving cutting resistance during cutting to be put into contact with a to-be-cut object G, mechanical contact resistance, which has conventionally not been able to be avoided by a conventional inner-diameter blade, can greatly be reduced since the contact part of the to-be-cut object G is ground by the abrasive grain layers 118.

Besides, since the abrasive grain layers 118 are formed so as to cover both side surfaces 115*a* of the base plate 115 of the inner-diameter blade 111, the inner-diameter blade 111 is covered by the abrasive grain layers 118, therefore its mechanical strength is increased and the inner-diameter blade 111 has no chance to be bowed during cutting, so that a cutting surface is not formed so as to be curved (FIGS. 7(*a*), 7(*b*) and 7(*c*)).

A size of abrasive grains used for the inner-diameter blade 111 of the present invention may be of the order of #170 as in a conventional way, for use in the tip portion 117. On the other hand, a size of abrasive grains for use in the abrasive grain layer 118 is preferably finer than those for use in the tip portion 117, for example about #200.

A height, that is a thickness, (ranged roughly from 40 to 140 μm) of the abrasive grain layer 118 in the thickness direction of the metal base plate is preferably lower than a height, that is a thickness, (ranged from 50 to 150 μm) of a side part of the tip portion 117. If the height of an abrasive grain layer 118 exceeds the height of a side of the tip portion, there arises a disadvantage of difficulty in operation.

Figure 8A:
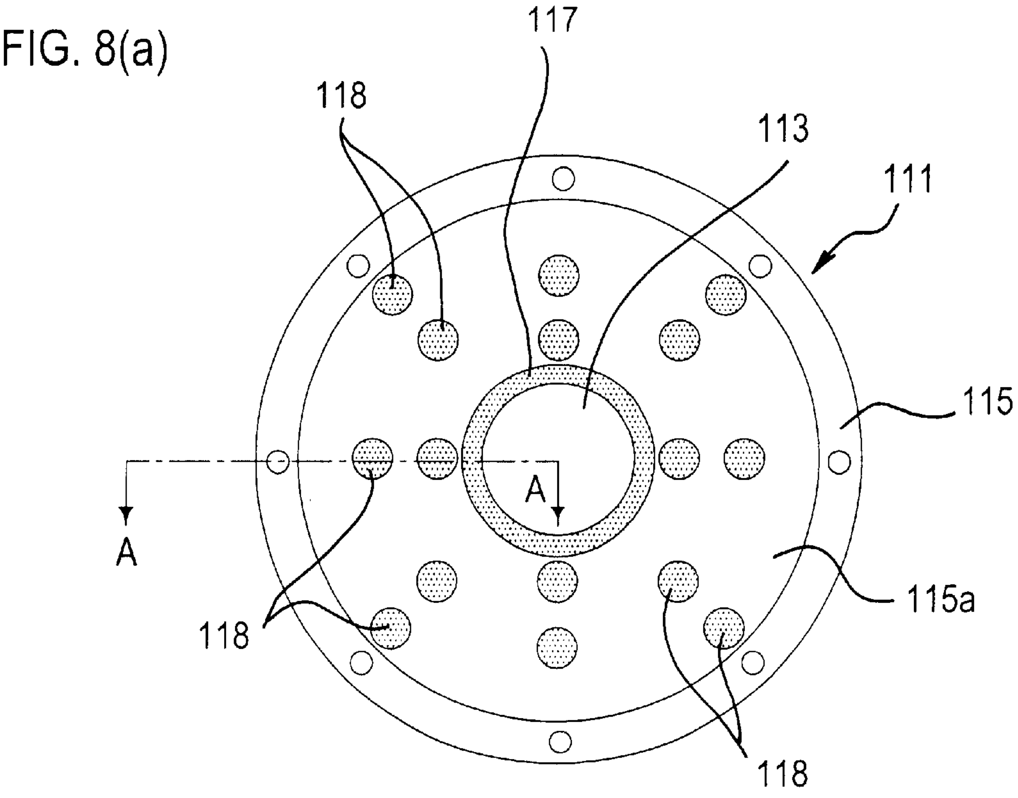
FIGS. 8(*a*) and 8(*b*) are views showing a second embodiment of an inner-diameter blade of the present invention, FIG. 8(*a*) is a front view of the inner-diameter blade of the present invention and FIG. 8(*b*) is a sectional view taken on line A—A of FIG. 8(*a*)
Figure 8B:
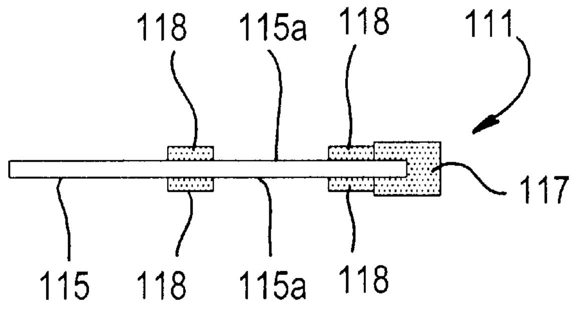
Figure 9A:
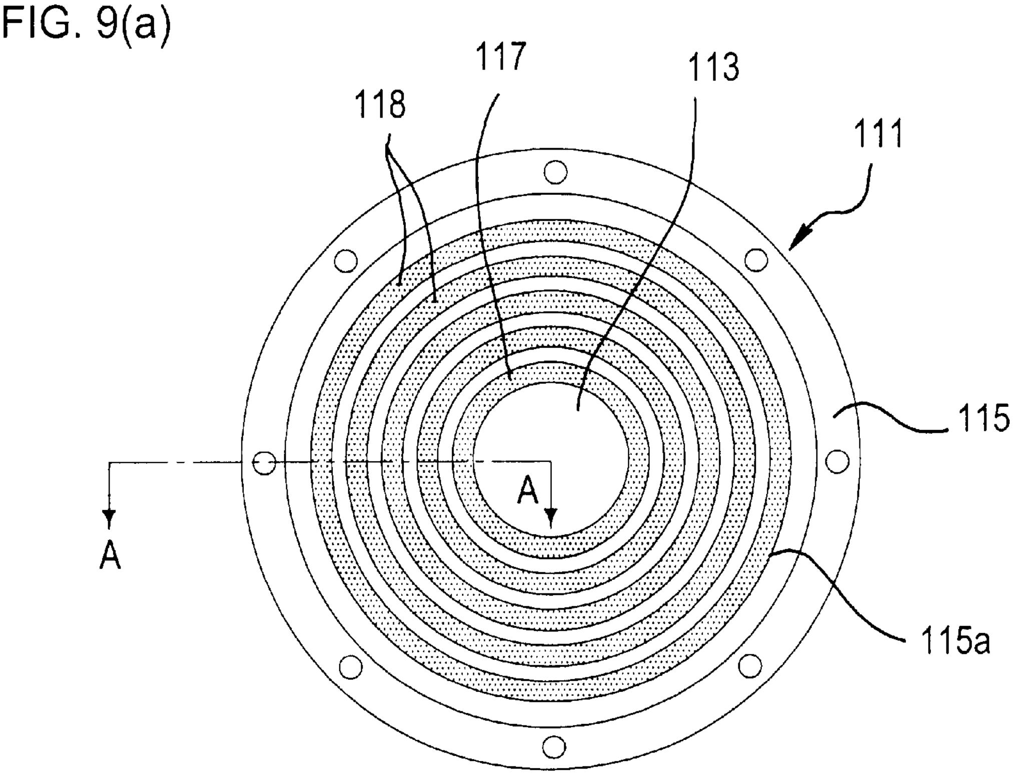
FIGS. 9(*a*) and 9(*b*) are views showing a third embodiment of an inner-diameter blade of the present invention, FIG. 9(*a*) is a front view of the inner-diameter blade of the present invention and FIG. 9(*b*) is a sectional view taken on line A—A of FIG. 9(*a*)
Figure 9B:
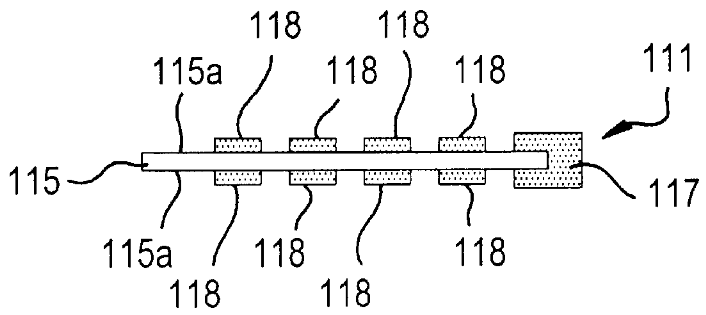
Figure 10:
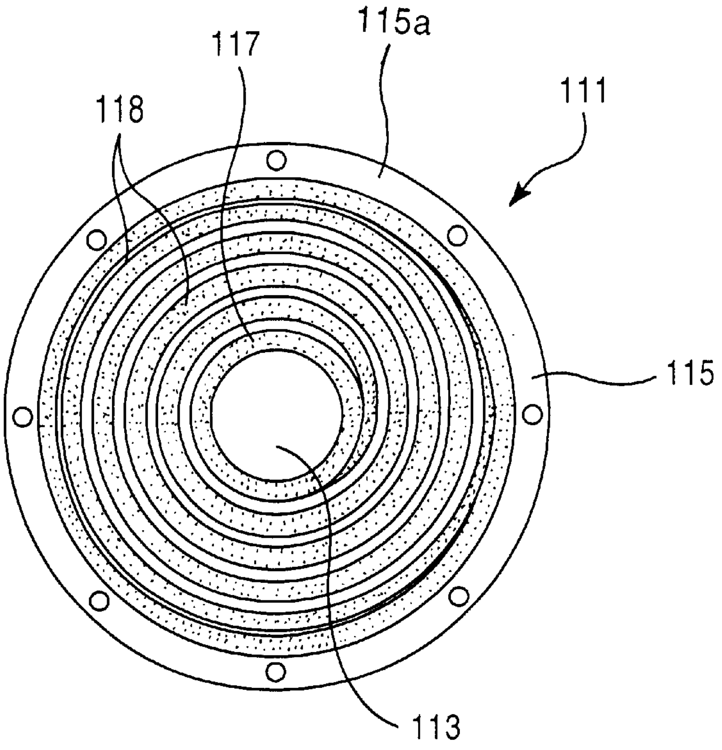
FIG. 10 is a front view showing a fourth embodiment of an inner-diameter of the present invention.
Figure 11:
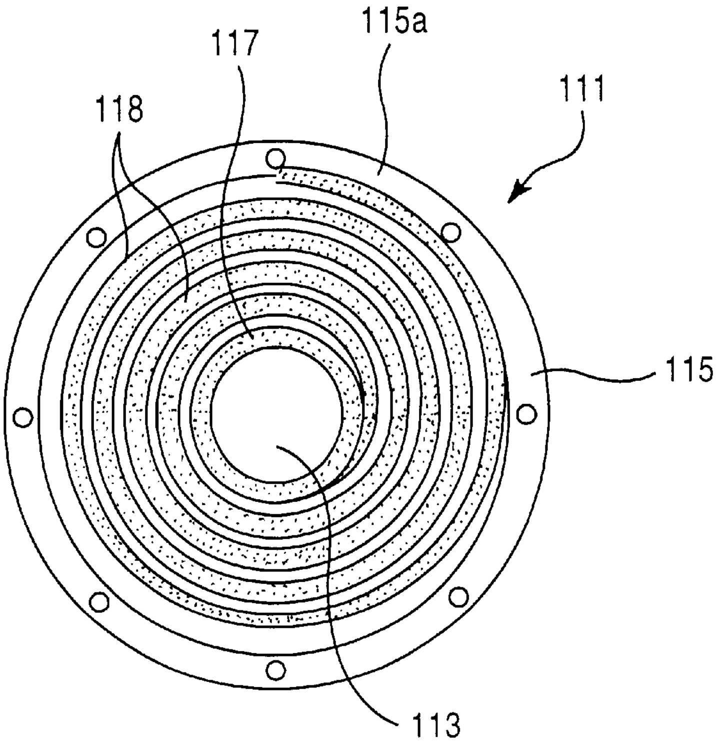
FIG. 11 is a front view showing a fifth embodiment of an inner-diameter of the present invention.

The abrasive grain layers 118 may be formed across all the side surfaces 115*a* of the base plate 115, but can be formed in parts thereof. When the abrasive grain layer is formed on a part of a side of the metal base plate, there is no specific limitation on a way of forming the abrasive grain layer, but various ways of forming, such as a multiple dot scatter pattern (FIG. 8(*a*)), a multiple concentric circle pattern (FIG. 9(*a*)), a spiral or vortical pattern (FIGS. 10 and 11), a radiating pattern (FIG. 12) and the like can selectively be adopted.

While a sectional shape of the tip portion 117 of an inner-diameter blade 111 of the present invention may be a flat shape of the outer end face as shown in FIG. 5(*b*) and FIG. 7(*c*), the sectional shape is preferably of an angular protrusion whose apex has an angle θ like a shape shown in FIG. 1(*c*). With such a sectional shape, cutting resistance decreases as in the case of an outer-diameter blade 11 shown in FIG. 4(*a*), compared with a conventional flat shape of the outer end face.

An apex angle of the angled protrusion at the outer end face of the tip portion 117 is preferably set in the range of 45° to 120°. If the apex angle θ is less than 45°, cutting resistance is smaller, but friction by the tip portion 117 increases, which causes a lifetime of the inner-diameter blade 111 to be reduced, corresponding to increase in the friction. On the other hand, if the apex angle θ exceeds 120°, an effect to decrease cutting resistance is diminished, corresponding to increase in the apex angle while the action and effect of the present invention is still exerted and achieved, as in the case of the apex angle in the specified range. The apex angle is more preferably set in the range of 60° to 90°.

As a hard material that is an object for cutting with the inner-diameter blade, there can be named similar material of those in the case of the outer-diameter blade described above.

Then, description will be made of an embodiment of a core drill of the present invention with reference to FIGS. 13(*a*), 13(*b*), 13(*c*) and 13(*d*) to FIG. 17 of the accompanying drawings.

Figure 17:
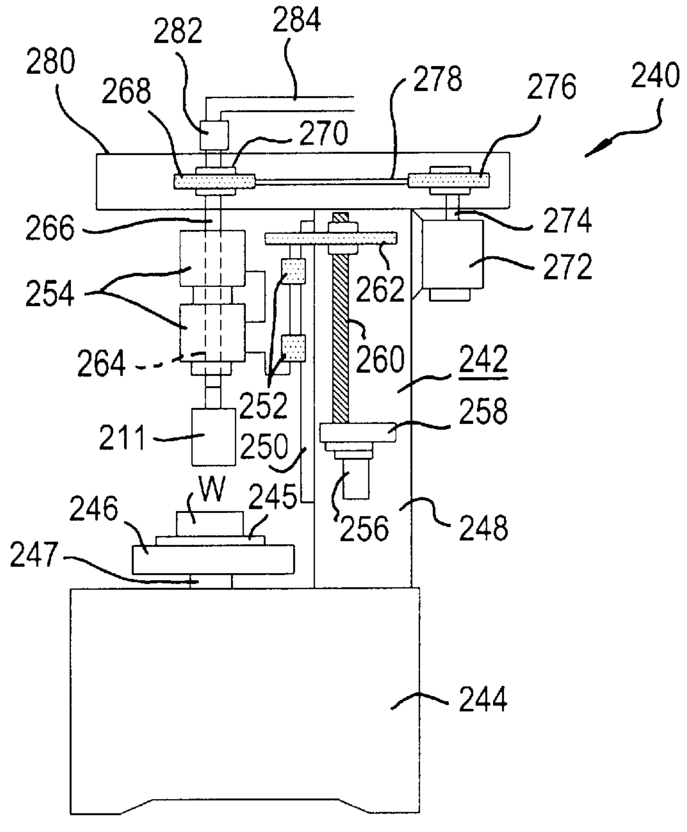
FIG. 17 is a side view of the core drill processing machine of the present invention.
Figure 29A:
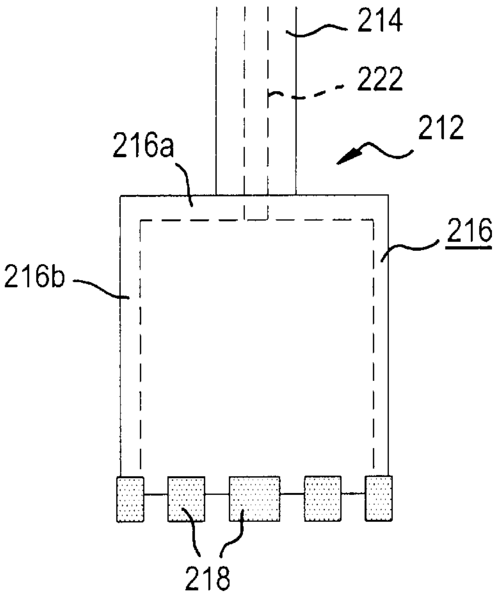
FIGS. 29(*a*), 29(*b*) and 29(*c*) are views showing one example of a conventional core drill, FIG. 29(*a*) is a front view, FIG. 29(*b*) is a vertical sectional view and FIG. 29(*c*) is a bottom view.
Figure 29B:
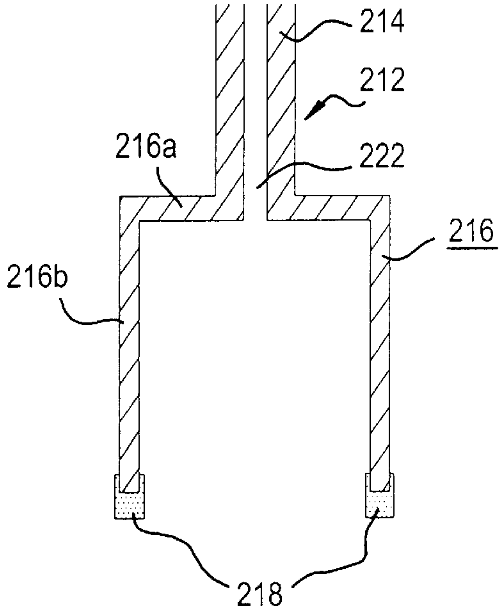
Figure 29C:
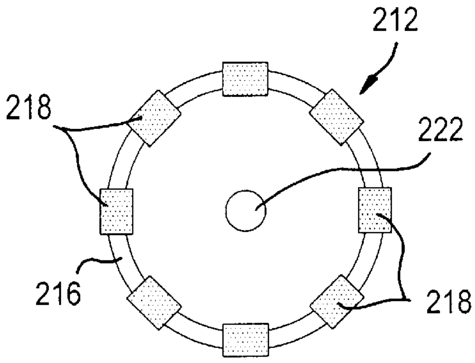
Figure 30:
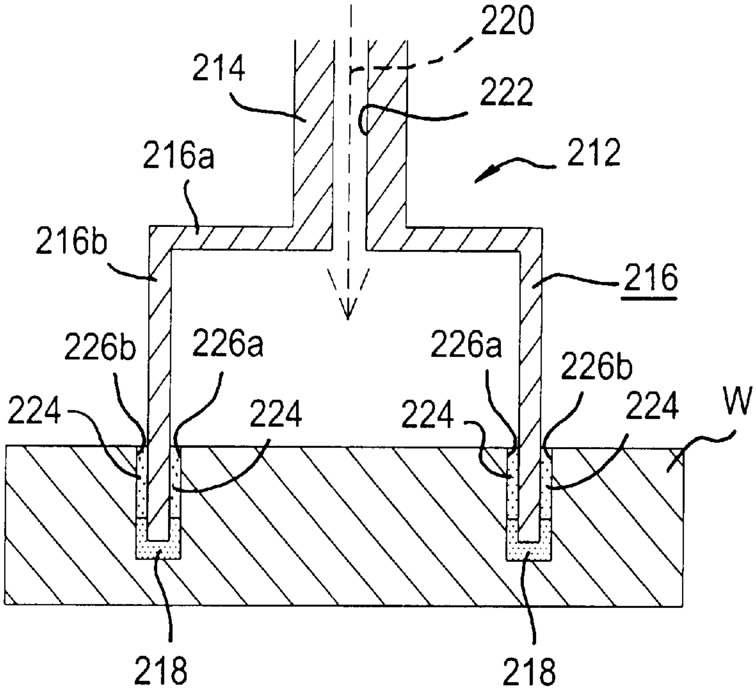
FIG. 30 is a sectional view illustrating a state in which hole forming is performed in a workpiece by a conventional core drill.
Figure 31:
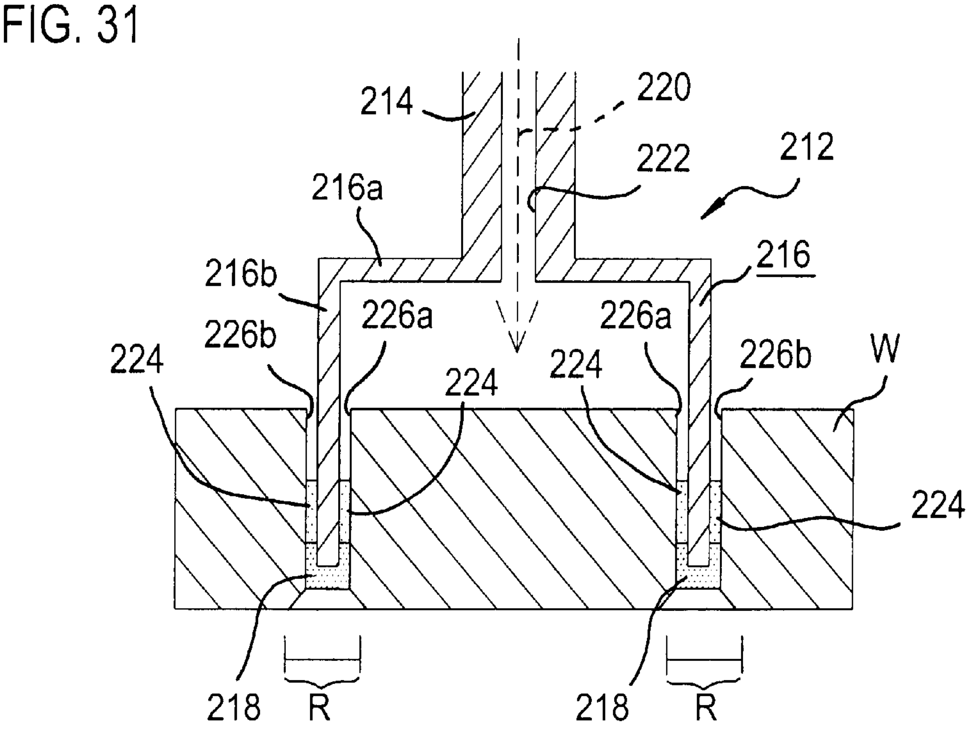
FIG. 31 is a sectional view showing a state in which grinding further progresses from the state of FIG. 30 till just before the grinding is finished.

In FIGS. 13(*a*), 13(*b*), 13(*c*) and 13(*d*) to FIG. 17, the same as and similar members of those in FIGS. 29(*a*), 29(*b*) and 29(*c*) to FIG. 31 are sometimes indicated by the same reference marks.

As shown in FIGS. 13(*a*), 13(*b*), 13(*c*) and 13(*d*), a core drill 211 of the present invention, as in a conventional case, comprises: a steel shank 214 acting as a rotary shaft, a base metal section 216 having a cup-like shape constructed of a disk-like top wall 216*a* and a cylindrical side wall 216*b* provided on a fore-end of a shank 214; a grinding stone portion 217 mounted on an outer end part of the base metal section 216, whose abrasive grains are fixed to the fore-end part of the base metal section. The core drill 211 constitutes the core drill processing machine 240 by mounting on the body 242 of a core drill processing machine 240 and the core drill processing machine 240 is driven to rotate the shank 214, the base metal section 216 and the grinding stone portion 217. The grinding stone portion 217, while rotating, is put into contact with a workpiece W so that the workpiece W can be ground through to form a circle hole in section leaving a cylindrical core therein.

A through-hole 222 along an axis of the shank 214 of the core drill 211 is formed in the central part of the shank in order to supply a grinding liquid 220 to a working area in grinding through the through-hole 222, which is a similar construction of a conventional case.

A first feature of an core drill 211 of the present invention is that abrasive grain layers 230*a* and 230*b* are formed on inner/outer side surfaces of a cylindrical side wall 216*b* of the base metal section 216, whose abrasive grains are fixed to the inner/outer side surfaces of a cylindrical side wall thereof by metal bonding, resin bonding, electroplating or the like. By providing the abrasive grain layers, grinding powder of the workpiece is further pulverized into finer particles, the finer grinding powder is discharged through gaps between the cylindrical side wall 216*b* of the core drill 211 and the workpiece W and, a supply/discharge amount of grinding liquid 220, thereby, is sufficiently secured, which enables efficient grinding to be realized.

A size of abrasive grains used in the grinding stone portion 217 of a core drill 211 of the present invention may be of the order of #170 as in a conventional case. On the other hand, a size of the abrasive grain layers 230*a* and 230*b* is preferably finer than abrasive grains of the grinding stone portion 217, say #200 for example.

Figure 15:
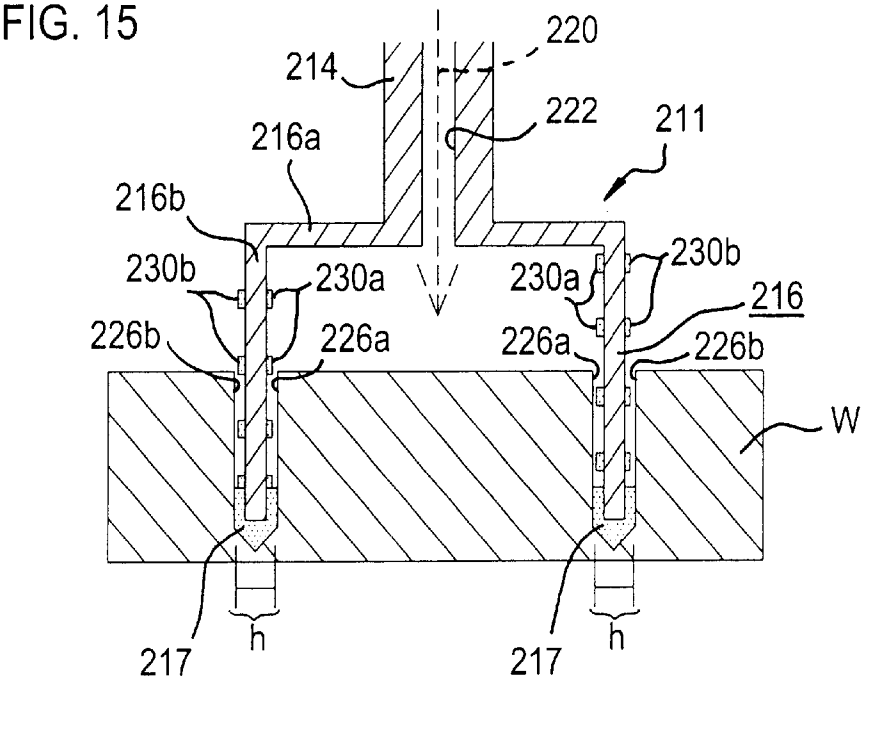
FIG. 15 is a sectional view illustrating a state in which the grinding further progresses from a state of FIG. 14 till just before the grinding is finished.

There is no specific limitation on a way of forming the abrasive grain layer as far as grinding powder of the workpiece can further be pulverized into finer particles and the finer grinding powder is discharged through gaps between the cylindrical side wall 216*b* and the workpiece W, but a spiral pattern is preferably formed as shown in FIGS. 13(*a*), 13(*b*), 13(*c*) and 13(*d*) to FIG. 15.

A second feature of a core drill 211 of the present invention is that a sectional shape of the grinding stone portion 217, as shown in FIG. 13(*b*), the outer end face has an angular protrusion whose apex has an angle θ. With such a shape, cutting resistance can be reduced compared with a flat shape of the outer end part in a conventional way and a pass-though area h of the workpiece W through which the core drill 211 pass is narrower than a pass-through area R encountered in a conventional way, which can make generation of defects such as cracks and indentations after chipping on the pass-through of the core drill reduced greatly.

An apex angle θ of an angular protrusion at the fore-end face of the grinding stone portion 217 is preferably set in the range of 45° to 120°. If the apex angle is less than 45°, cutting resistance is smaller, but friction by the grinding stone portion 217 increases, which entails a shorter lifetime, while if the apex angle θ exceeds 120°, an effect to decrease cutting resistance is smaller corresponding to increase in apex angle, but the action and effect of the present invention is achieved in an unchanged manner.

The apex angle θ is more preferably set in the range of 60° to 90°. Incidentally, in the example of the figure, a case of θ=90° is shown as a preferred example.

Figure 16:
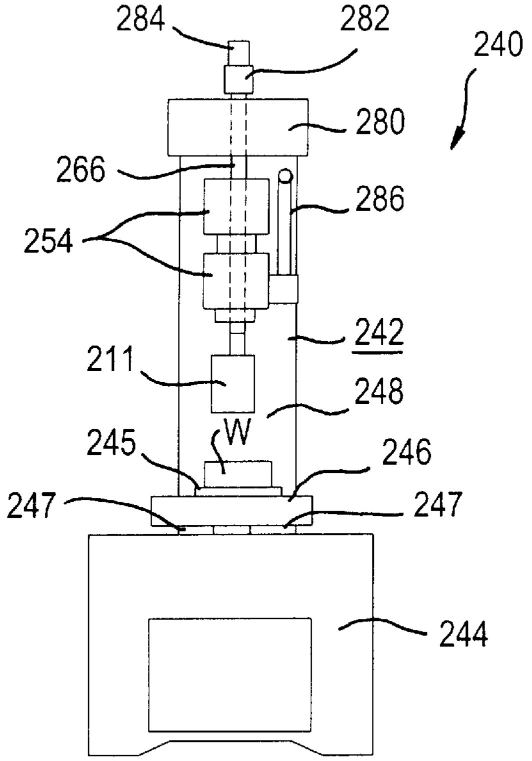
FIG. 16 is a front view of a core drill processing machine of the present invention.

Then, description will be made of a core drill processing machine 240 mounted with a core drill 211 of the present invention with reference to FIGS. 16 and 17.

A core drill processing machine 240 comprises: the body 242 of the core drill processing machine 240; and a core drill 211. The body 242 of the core drill processing machine is provided with a frame 244. A work table support base 247 on which a work table 246 is fixedly placed is centrally provided on the top surface of the frame 244. A workpiece W of glass, for example quartz glass, is fixedly placed on the top surface of the work table 246 with the help of a workpiece attaching plate 245 interposed therebetween.

A support 248 is vertically mounted at the peripheral part of the frame 244. A long guide 250 is attached on an inner side surface of the support 248 along a vertical direction. A support block 254 is, in a vertically movable manner, mounted to the long guide 250 with the help of a slide bearings 252 interposed therebetween.

A numerical mark 256 indicates a motor for moving the core drill 211 upward or downward. The motor 256 is attached to the lower surface of a plate 258 that is provided on a side surface of the support 248. A ball screw 260 is rotatably connected to the motor 256. A numerical mark 262 indicates a spindle support that is mounted to the top end part of the ball screw 260 and one end of the spindle support 262 is connected to the support block 254. A through-hole 264 is formed in the central part of each of the support blocks 254 with the through-holes opening upward and downward and a rotary shaft 266 is freely rotatably inserted through the through-hole 264. A numerical mark 268 indicates a pulley and the pulley 268 is attached to a rotary block 270 fixed to the rotary shaft 266 above the support block 254. The core drill 211 is fixed to the lower end part of the rotary shaft 266 in a demountable manner.

Accordingly, when the motor is driven to rotate, the ball screw 260 is rotated, the spindle support 262 is moved upward or downward in company of the rotation, the support block 254, the rotary shaft 266 and the core drill 211 are moved upward or downward in concert with the movement of the spindle support 262.

A numerical mark 272 indicates a motor for rotating the core drill 211 and attached to the top part of the support 248. A motor pulley 276 is fixed to a motor shaft 274 of the motor 272. The motor pulley 276 and the pulley 268 are wound over by a pulley belt 278.

Therefore, rotation of the motor 272 is transmitted to the rotary shaft 266 through the motor shaft 274, the motor pulley 276, the pulley 268 and the rotary block 270 and the rotary shaft 266 is rotated. Incidentally, a numerical mark 280 indicates a cover member, which covers the motor pulley 276, the pulley belt 278 and the pulley 268.

Figure 14:
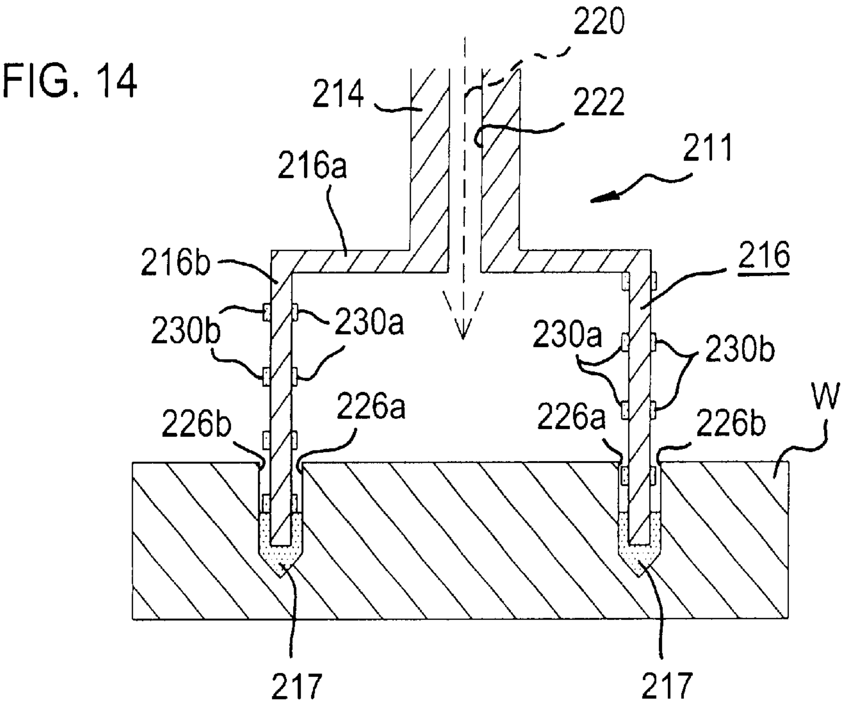
FIG. 14 is a sectional view illustrating a state in which a hole is formed in a workpiece and grinding is in progress by a core drill of the present invention.

The top part of the rotary shaft 266 is connected to a grinding liquid supply pipe 284 by way of a rotary joint 282. The grinding liquid 220 which is fed through the grinding liquid supply pipe 284 is supplied to a working area in grinding through the through-hole 222 along the axis as described above (FIGS. 14 and 15). A numerical mark 286 indicates a manual hand for moving the rotary shaft 266 in a vertical direction.

With a core drill processing machine, which has the above described construction, and in whose body 242 the core drill 211 is mounted, in use, the core drill 211 is rotated while moving upward or downward relatively to a workpiece such as quartz glass that is fixedly held on the work table 246 with the help of the workpiece attaching plate 24; and thereby, hole forming can be performed in the workpiece.

As hard material that is an object for hole formation by a core drill 211 of the present invention, there can be named hard material similar to in the case of an outer-diameter blade that is described above.

In the mean time, when an outer-diameter blade, an inner-diameter blade and a core drill available in a conventional technique each are used once in cutting of or hole forming in hard material, there arise inconveniences that they lose a tip portion or a grinding stone portion, in addition, bowing and bending are respectively generated in a hollow base plate and a metal base section and furthermore, side surfaces of the blades and the metal base section are subjected to damaging. Therefore, a metal base plate, a hollow base plate and a metal base section are discarded once they have been used, though each of such parts is expensive and occupies a large percent of production cost of the respective tools.

When abrasive grain layers are respectively formed on side surfaces of a metal base plate, side surfaces of a hollow base plate and inner and outer side surface of a cylindrical side wall of a metal base section as in the above described constructions of an outer-diameter blade, an inter-diameter blade or a core drill of the present invention, by the presence of such abrasive grain layers, the metal base plate, the hollow base plate and the metal base section are reinforced and not only are bowing and bending avoided from occurring but also the side surfaces of the tools are prevented from damaging.

Therefore, the metal base plate, the hollow base plate and the metal base section each maintain its before-use performance figures even after use. Hence, when a used metal base plate, a used hollow base plate and a used metal base section are recycled and tip portions and a grinding stone portion which are lost are again formed and, as complete tools, mounted to the machines in place, a recycled outer-diameter blade, a recycled inner-diameter blade and a recycled core drill serve each with no much difference in performance from that of a new one and in this way, recycling can be realized, which largely contributes to reduction in production cost.

Below description will be made of production of an outer-diameter blade of the present invention and cutting using an outer-diameter blade cutting machine mounted with the outer-diameter blade of the present invention, being based on examples.

EXAMPLE 1

In order to produce an outer-diameter blade of the present invention, a diamond tip portion of a thickness 1.3 mm, a width 7 mm and using diamond abrasive grains of a mesh number #170 was formed, while 15 sintering, on a metal base plate of an outer-diameter 300 mm and a thickness 1.0 mm by metal bonding, the outer end face of the diamond tip portion was shaped to be of an apex angle 90° and an electroplated layer of a thickness 0.1 mm and composed of diamond abrasive grains of a mesh number #200 was formed as far as 80 mm inward from the diamond tip portion. Thus produced outer-diameter blade was used to cut a quartz glass rod of an outer diameter 80 mm.

Detection of cutting resistance: a motor is used for rotating an outer-diameter blade and when cutting resistance occurs and acts on the outer-diameter blade, a load is imposed on the rotation motor and therefore a current value flowing through the motor is increased. The current value can be measured to detect a magnitude of cutting resistance.

In order to detect cutting resistance, values of the current of a motor for rotating the outer-diameter blade were respectively measured at cutting depths of 5 mm, 10 mm, 15 mm, 20 mm, 30 mm, 40 mm, 60 mm and 80 mm and results are shown in Table 1. Further, numerals shown in Table 1 are also shown as a graph in FIG. 22. As seen from Table 1 and FIG. 22, as cutting progressed, the current was increased. While the maximum current value was measured at the central part of the quarts glass rod, increase in current value when the maximum was detected was not large and therefore the cutting resistance was indicated to be generally small.

After the cutting was finished, cutting surfaces were observed and neither of occurrences of chipping, a burr and bowing were found.

Comparative Example 1

In order to produce an outer-diameter blade for comparison, a conventional type diamond tip portion of a thickness 1.3 mm, a width 7 mm and using diamond abrasive grains of a mesh number #170 was formed, while sintering, on a metal base plate of an outer-diameter 300 mm and a thickness 1.0 mm by metal bonding. Thus produced outer-diameter blade was used to cut a quartz glass rod of an outer diameter 80 mm.

Figure 22:
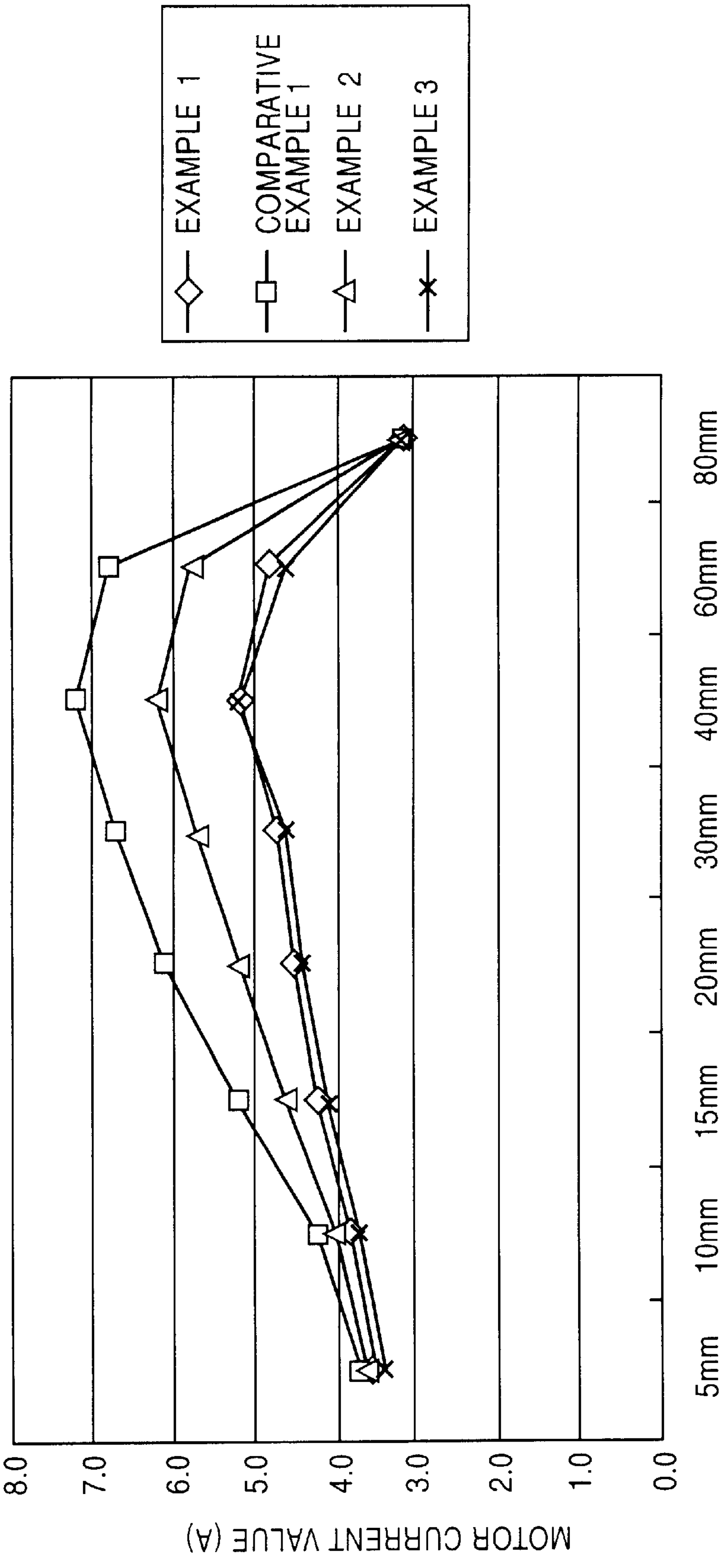
FIG. 22 is a graph showing a change in current a motor for rotation of an outer-diameter blade during cutting in Examples 1 to 3 and Comparative Example 1.

In order to detect cutting resistance, values of the current of motor for rotating the outer-diameter blade were measured and results were as shown in Table 1 and FIG. 22. As cutting progressed, the current was increased and the maximum current value was measured at the central part of the quarts glass rod.

A cutting surface of the quartz rod was observed when the cutting was finished and chipping occurred on the cutting surface. Besides, a burr was generated at a cut-off end of a cutting surface and the cutting surface was curved by 1 mm as the maximum deviation. Further, a side surface of the outer-diameter blade was observed and a damage was found at a contact point with the quartz glass rod.

EXAMPLE 2

In order to produce an outer-diameter blade, a diamond tip portion of a thickness 1.3 mm, a width 7 mm and using diamond abrasive grains of a mesh number #170 was formed, while sintering, on a metal base plate of an outer-diameter 300 mm and a thickness 1.0 mm by metal bonding, the outer end face of the diamond tip portion was shaped to be of an apex angle 125° and an electroplated layer of a thickness 0.1 mm and composed of diamond abrasive grains of a mesh number #200 was formed as far as 80 mm inward from the diamond tip portion. Thus produced outer-diameter blade was used to cut a quartz glass rod of an outer diameter 80 mm.

Values of the current to detect cutting resistance were as shown in Table 1 and FIG. 22. The maximum value of the current was between the maximums of Example 1 and Comparative Example 1. A cutting surface of the quartz glass rod was observed after the cutting was finished, neither of occurrences of indentations caused by chipping and burrs were found but the cutting surface was curved by 0.3 mm as the maximum deviation.

EXAMPLE 3

In order to produce an outer-diameter blade, a diamond tip portion of a thickness 1.3 mm, a width 7 mm and using diamond abrasive grains of a mesh number #170 was formed, while sintering, on a metal base plate of an outer-diameter 300 mm and a thickness 1.0 mm by metal bonding, the outer end face of the diamond tip portion was shaped to be of an apex angle 40° and an electroplated layer of a thickness 0.1 mm and composed of diamond abrasive grains of a mesh number #200 was formed as far as 80 mm inward from the diamond tip portion. Thus produced outer-diameter blade was used to cut a quartz glass rod of an outer diameter 80 mm.

Values of the current to detect cutting resistance were as shown in Table 1 and FIG. 22. The maximum value of the current was same as the maximum of Example 1. A cutting surface of the quartz glass rod was observed after the cutting was finished, neither of occurrences of indentations caused by chipping and burrs were found and the cutting surface was not curved either. However, the outer end face of the diamond tip portion was greatly consumed and the apex part was worn to lose by 1 mm.

TABLE 1

Change in current of motor for rotating diamond outer-diameter blade during cutting (Unit: A)

| Cutting depths | Example 1 | Comparative Example 1 | Example 2 | Example 3 |
|---|---|---|---|---|
| 5 mm | 3.5 | 3.7 | 3.6 | 3.4 |
| 10 mm | 3.8 | 4.2 | 4.0 | 3.7 |
| 15 mm | 4.2 | 5.2 | 4.6 | 4.1 |
| 20 mm | 4.5 | 6.1 | 5.2 | 4.4 |
| 30 mm | 4.7 | 6.7 | 5.7 | 4.6 |
| 40 mm | 5.2 | 7.2 | 6.2 | 5.2 |
| 60 mm | 4.8 | 6.8 | 5.8 | 4.6 |
| 80 mm | 3.2 | 3.2 | 3.2 | 3.2 |

EXAMPLE 4

In order to produce an outer-diameter blade, a diamond tip portion of a thickness 1.3 mm, a width 7 mm and using diamond abrasive grains of a mesh number #170 was formed, while sintering, on a metal base plate of an outer-diameter 300 mm and a thickness 1.0 mm by metal bonding, the outer end face of the diamond tip portion was shaped to be an apex angle 90° and an electroplated layer of a thickness 0.1 mm and composed of diamond abrasive grains of a mesh number #200 was formed as far as 80 mm inward from the diamond tip portion. Thus produced outer-diameter blade was used to cut a SiC rod of an outer diameter 60 mm.

Figure 23:
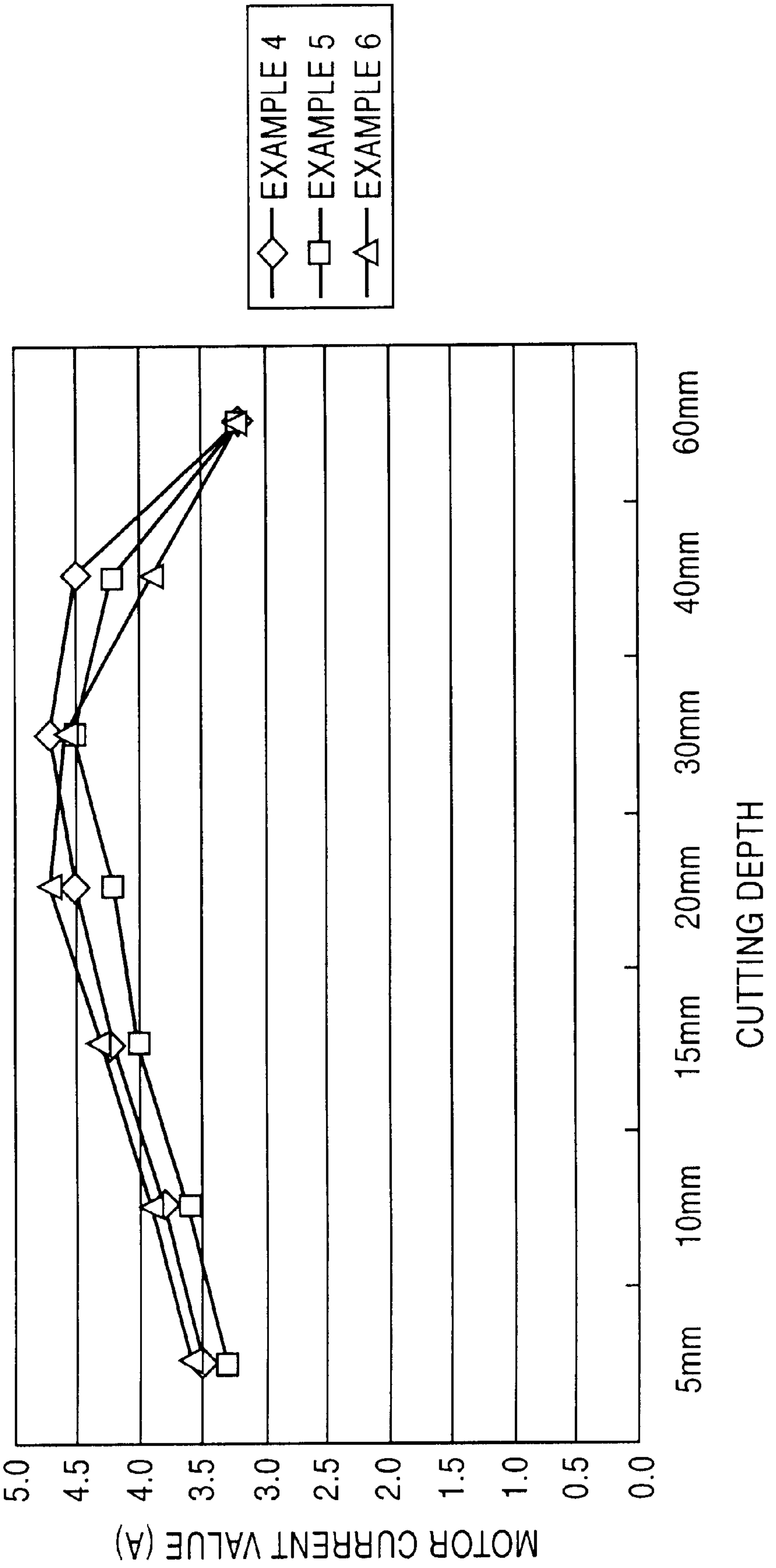
FIG. 23 is a graph showing a change in current a motor for rotation of an outer-diameter blade during cutting in Examples 4 to 6.

In order to detect cutting resistance, values of the current of motor for rotating the outer-diameter blade were measured and results were as shown in Table 2 and FIG. 23. As cutting progressed, the current was increased. While the maximum current value was measured at the central part of the SiC rod, increase in current value when the maximum was detected was not large and therefore the cutting resistance was indicated to be generally small.

After the cutting was finished, cutting surfaces were observed and neither of occurrences of chipping, a burr and bowing were found.

EXAMPLE 5

In order to produce an outer-diameter blade, a diamond tip portion of a thickness 1.3 mm, a width 7 mm and using diamond abrasive grains of a mesh number #170 was formed, while sintering, on a metal base plate of an outer-diameter 300 mm and a thickness 1.0 mm by metal bonding, the outer end face of the diamond tip portion was shaped to be of an apex angle 90° and an electroplated layer of a thickness 0.1 mm and composed of diamond abrasive grains of a mesh number #200 was formed as far as 80 mm inward from the diamond tip portion. Thus produced outer-diameter blade was used to cut an alumina rod of an outer diameter 60 mm.

In order to detect cutting resistance, values of the current of motor for rotating the outer-diameter blade were measured and results were as shown in Table 2 and FIG. 23. As cutting progressed, the current was increased. While the maximum current value was measured at the central part of the alumina rod, increase in current value when the maximum was detected was not large and therefore the cutting resistance was indicated to be generally small.

After the cutting was finished, cutting surfaces were observed and neither of occurrences of chipping, a burr and bowing were found.

EXAMPLE 6

In order to produce an outer-diameter blade, a diamond tip portion of a thickness 1.3 mm, a width 7 mm and using diamond abrasive grains of a mesh number #170 was formed, while sintering, on a metal base plate of an outer-diameter 300 mm and a thickness 1.0 mm by metal bonding, the outer end face of the diamond tip portion was shaped to be of an apex angle 90° and an electroplated layer of a thickness 0.1 mm and composed of diamond abrasive grains of a mesh number #200 was formed as far as 80 mm inward from the diamond tip portion. Thus produced outer-diameter blade was used to cut a gallium arsenide single crystal rod of an outer diameter 50 mm.

In order to detect cutting resistance, values of the current of motor for rotating the outer-diameter blade were measured and results were as shown in Table 2 and FIG. 23. As cutting progressed, the current was increased. While the maximum current value was measured at the central part of the gallium arsenide rod, increase in current value when the maximum was detected was not large and therefore the cutting resistance was indicated to be generally small.

After the cutting was finished, cutting surfaces were observed and neither of occurrences of chipping, a burr and bowing were found.

TABLE 2

Change in current of motor for rotating diamond outer-diameter blade during cutting (Unit: A)

| Cutting depths | Example 4 | Example 5 | Example 6 |
|---|---|---|---|
| 5 mm | 3.5 | 3.3 | 3.6 |
| 10 mm | 3.8 | 3.6 | 3.9 |
| 15 mm | 4.2 | 4.0 | 4.3 |
| 20 mm | 4.5 | 4.2 | 4.7 |
| 30 mm | 4.7 | 4.5 | 4.6 |
| 40 mm | 4.5 | 4.2 | 3.9 |
| 60 mm | 3.2 | 3.2 | 3.2 |

EXAMPLES 7 TO 9

Cutting operations were conducted similar to the case of Example 1 with the exception that a soda lime glass rod, a lead glass rod and a quartz crystal rod were employed instead of a quartz glass rod and results were respectively similar to those of Example 1.

EXAMPLE 10

An outer-diameter blade was produced similar to in Example 1 with the exception that a CBN tip portion was formed using CBN abrasive grains of a mesh number #170 and an electroplated layer including CBN abrasive grains of a mesh number #400 was applied. Thus produced outer-diameter blade was used to cut a stainless steel rod of an outer diameter 80 mm.

Figure 24:
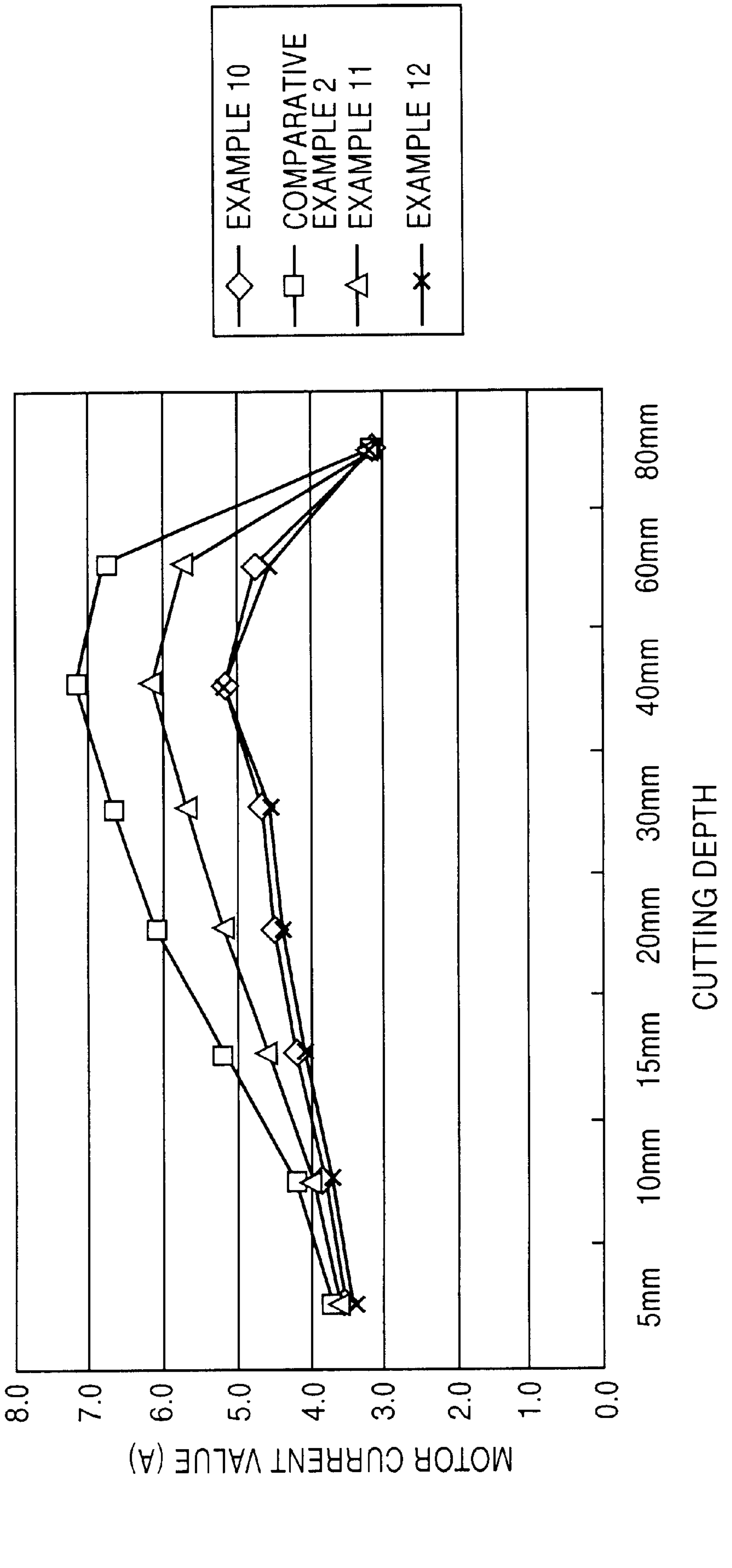
FIG. 24 is a graph showing a change in current a motor for rotation of a CBN blade during cutting in Examples 10 to 12 and Comparative Example 2.

Cutting resistance was measured similar to in Example 1 and results are shown in Table 3. Numerical values shown in Table 3 are also shown in FIG. 24 as a graph. As can be seen from table 3 and FIG. 24, as cutting progresses, a value of the current is increased. While the maximum current value was measured at the central part of the stainless steel rod, increase in current value when the maximum was detected was not large and therefore the cutting resistance was indicated to be generally small.

After the cutting was finished, cutting surfaces were observed and neither chips, a burr and bow were found.

Comparative Example 2

An outer-diameter blade was produced similar to Comparative Example 1 with the exception that a CBN tip portion was formed using CBN abrasive grains of a mesh number #170 and the CBN outer-diameter blade was used to cut a stainless steel rod of an outer diameter 80 mm.

In order to detect cutting resistance, values of the current of motor for rotating the CBN outer-diameter blade were measured and results were as shown in Table 3 and FIG. 24. As cutting progressed, the current was increased and the maximum current value was measured at the central part of the stainless steel rod.

A cutting surface of the stainless steel rod when the cutting was finished was observed and chipping was found. Besides, a burr was found at a cut-off end of the cutting surface and the cutting surface was curved by 1 mm as the maximum deviation. A side of the CBN blade was observed and a damage had been produced at a contact point with the stainless steel rod.

EXAMPLE 11

An outer-diameter was produced similar to Example 2 with the exception that a CBN tip portion was formed using CBN abrasive grains of a mesh number #170 and an electroplated layer using CBN abrasive grains of a mesh number #400 was further applied and the blade was used to cut a stainless steel rod of an outer diameter 80 mm.

Values of the current to detect cutting resistance were as shown in Table 3 and FIG. 24. The maximum value of the current was between those of Example 10 and Comparative Example 2. A cutting surface was observed and neither chips nor a burr was observed but the cutting surface was curved by 0.3 mm as the maximum deviation.

EXAMPLE 12

An outer-diameter blade was produced similar to Example 3 with the exception that a CBN tip portion was formed using CBN abrasive grains of a mesh number #170 and an electroplated layer using CBN abrasive grains of a mesh number #400 was further applied and the blade was used to cut a stainless steel rod of an outer diameter 80 mm.

Values of the current to detect cutting resistance were as shown in Table 3 and FIG. 24. The maximum value of the current was same as the maximum of Example 10. A cutting surface of the stainless steel rod was observed after the cutting was finished, neither chips nor a burr was observed and the cutting surface was not curved either. However, the outer end face of the CBN tip portion was greatly consumed and the apex part was worn to lose by 1 mm.

TABLE 3

Change in current of motor for rotating CBN outer-diameter blade during cutting (Unit: A)

| Cutting depths | Example 10 | Comparative Example 2 | Example 11 | Example 12 |
|---|---|---|---|---|
| 5 mm | 3.6 | 3.8 | 3.7 | 3.5 |
| 10 mm | 3.9 | 4.3 | 4.1 | 3.8 |
| 15 mm | 4.3 | 5.3 | 4.7 | 4.2 |
| 20 mm | 4.6 | 6.2 | 5.3 | 4.5 |
| 30 mm | 4.8 | 6.8 | 5.8 | 4.7 |
| 40 mm | 5.3 | 7.3 | 6.3 | 5.3 |
| 60 mm | 4.9 | 6.9 | 5.9 | 4.7 |
| 80 mm | 3.2 | 3.2 | 3.2 | 3.2 |

EXAMPLE 13

An outer-diameter blade was produced similar to Example 4 with the exception that a CBN tip portion was formed using CBN abrasive grains of a mesh number #170 and an electroplated layer using CBN abrasive grains of a mesh number #400 was further applied and the blade was used to cut an SiC rod of an outer diameter 60 mm.

In order to detect cutting resistance, values of the current of motor for rotating the outer-diameter blade were measured and results were as shown in Table 4 and FIG. 25. As cutting progressed, the current was increased. While the maximum current value was measured at the central part of the SiC rod, increase in current value when the maximum was detected was not large and therefore the cutting resistance was indicated to be generally small. After the cutting was finished, cutting surfaces were observed and neither of occurrences of chipping and a burr were found and the cutting surface was not curved either.

EXAMPLE 14

An outer-diameter blade was produced similar to Example 5 with the exception that a CBN tip portion was formed using CBN abrasive grains of a mesh number #170 and an electroplated layer using CBN abrasive grains of a mesh number #400 was further applied and the blade was used to cut an alumina rod of an outer diameter 60 mm.

In order to detect cutting resistance, values of the current of motor for rotating the outer-diameter blade were measured and results were as shown in Table 4 and FIG. 25. As cutting progressed, the current was increased. While the maximum current value was measured at the central part of the alumina rod, increase in current value when the maximum was detected was not large and therefore the cutting resistance was indicated to be generally small. After the cutting was finished, cutting surfaces were observed and neither of occurrences of chipping and a burr were found and the cutting surface was not curved either.

EXAMPLE 15

An outer-diameter blade was produced similar to Example 6 with the exception that a CBN tip portion was formed using CBN abrasive grains of a mesh number #170 and an electroplated layer using CBN abrasive grains of a mesh number #400 was further applied and the blade was used to cut a gallium arsenide rod of an outer diameter 50 mm.

In order to detect cutting resistance, values of the current of motor for rotating the outer-diameter blade were measured and results were as shown in Table 4 and FIG. 25. As cutting progressed, the current was increased. While the maximum current value was measured at the central part of the gallium arsenide rod, increase in current value when the maximum was detected was not large and therefore the cutting resistance was indicated to be generally small. After the cutting was finished, cutting surfaces were observed and neither of occurrences of chipping and a burr were found and the cutting surface was not curved either.

TABLE 4

Change in current of motor for rotating CBN outer-diameter blade during cutting (Unit: A)

| Cutting depths | Example 13 | Example 14 | Example 15 |
|---|---|---|---|
| 5 mm | 3.6 | 3.3 | 3.6 |
| 10 mm | 3.9 | 3.6 | 3.9 |
| 15 mm | 4.3 | 4.0 | 4.3 |
| 20 mm | 4.5 | 4.2 | 4.7 |
| 30 mm | 4.8 | 4.5 | 4.6 |
| 40 mm | 5.2 | 4.2 | 3.9 |
| 60 mm | 4.9 | 3.2 | 3.2 |

Below description will be made of production of an inner-diameter blade of the present invention and cutting using an inner-diameter blade cutting machine mounted with the inner-diameter blade of the present invention, being based on examples.

EXAMPLE 16

A hollow metal base plate having a doughnut like shape and a hollow section therein, and of an inner diameter 220 mm, an outer diameter 700 mm and a thickness about 150 $\mu$m was prepared. A diamond abrasive grain (cutting abrasive grain) portion of a thickness 100 $\mu$m was formed along the inner peripheral part by electroplating and a diamond abrasive grain layers each of thickness about 90 $\mu$m were formed by electroplating up to 220 mm outward from the abrasive grain portion using diamond abrasive grains (grinding abrasive grains) finer than those for cutting. Thus produced inner-diameter blade was used to slice a silicon ingot of a diameter 200 mm to obtain 50 wafers.

Wafers obtained by the slicing were measured on bow and results were such that the maximum was 20 $\mu$m and the minimum was 12 $\mu$m. Besides, a bow of the inner-diameter blade was also measured after the slicing to be found 20 $\mu$m.

EXAMPLE 17

An inner-diameter blade similar to one used in Example 16 was used to slice a quartz glass ingot of a diameter 205 mm to obtain 30 disks each of a thickness 1.5 mm. The quartz glass disks thus obtained were measured on bows and results were such that the maximum was 18 $\mu$m and the minimum was 10 $\mu$m. Further, a bow of the inner-diameter blade after the cutting was measured to be found 18 $\mu$m.

Comparative Example 3

A hollow metal base plate having a doughnut like shape and a hollow section therein, and of an inner diameter 220 mm, an outer diameter 700 mm and a thickness about 150 $\mu$m was prepared. A diamond abrasive grain (cutting abrasive grains) portion of a thickness 100 $\mu$m was formed along the inner peripheral part by electroplating. Thus produced inner-diameter blade was used to slice a silicon ingot of a diameter 200 mm to obtain 50 wafers.

Wafers obtained by the slicing were measured on bow and results were such that the maximum was 75 $\mu$m and the minimum was 45 $\mu$m. Besides, a bow of the inner-diameter blade was measured after the slicing to be found 75 $\mu$m.

Comparative Example 4

An inner-diameter blade similar to one used in Comparative Example 3 was used to slice a quartz glass ingot of a diameter 205 mm to obtain 30 disks each of a thickness 1.5 mm. The quartz glass disks thus obtained were measured on bows and results were such that the maximum was 70 $\mu$m and the minimum was 40 $\mu$m. Further, a bow of the inner-diameter blade was measured after the slicing to be found 70 $\mu$m.

Below, description will be made of production of a core drill of the present invention and hole forming using a core drill processing machine mounted with the core drill of the present invention, being based on example.

EXAMPLE 18

A diamond core drill was produced in such a manner that a shank that was used to as a rotation shaft had a diameter of 30 mm; a through-hole formed in the shank along an axis thereof had a diameter of 5 mm; dimensions of a metal base section having a cup-like shape were an outer diameter of 98 mm, an inner diameter of 92 mm and a height of 125 mm; and 8 diamond grinding stone portion chips made of abrasive grains #120 and each of a thickness 5 mm, a width 15 mm, a height 10 mm and an apex angle 90° were fixedly formed at equiangular equal intervals along an outer end part of the metal base section through sintering by metal bonding. Spiral diamond abrasive layers each of a width 5 mm and a thickness 0.5 mm were further formed on outer and inner side surfaces of the metal base section using diamond abrasive grains of a size #170 at an elevation angle 15° from the bottom plane of the grinding stone portion chips by electroplating.

Thus produced diamond core drill was mounted on the body of a core drill processing machine to put the machine ready to use. A quartz glass disk of a diameter 200 mm and a thickness 100 mm was fixed on a table of the core drill processing machine with a soda lime sheet glass of a thickness 10 mm, having a larger diameter than quartz glass disk interposed therebetween, the quartz glass disk having been fixed on the soda lime sheet glass using wax through melting and solidification thereof. Hole forming was performed in the central part of the quartz glass disk to form a hole of a diameter 100 mm. Water as grinding liquid was continued to be poured in stream onto a working spot at a rate of 5 l/min during the processing from the through-hole of the shank.

A descending speed of the diamond core drill was set at 5 mm/min to form a hole in the quartz grass disk. No loading of workpiece powder occurred in a gap between the diamond core drill and the quartz glass during processing and hole forming was satisfactorily finished. A time period required for the processing was 25 min. The quartz glass was separated from the soda lime glass sheet after the processing and was observed. Chipping was found only a little in a pass-through area of the diamond core drill: chipping occurred so slightly that it does not affect a quality of the quartz glass disk seriously.

Comparative Example 5

A conventional core drill used in the comparative example was dimensionally same as that used in Example 18 but no angular part was formed at the outer end face of each of the grinding stone portion chips and in addition, diamond abrasive grains were not electroplated on the metal base section having a cup-like shape, as shown in FIGS. 29(*a*), 29(*b*) and 29(*c*) to FIG. 31. The conventional diamond core drill thus produced was mounted on the body of a core, drill processing machine and was used to form a hole in a quartz glass disk with the same size as that of Example 18 under the same conditions as those of Example 18.

While hole formation by the diamond core drill smoothly progressed in the first stage after start of the processing, loading of workpiece power occurred in a gap between the diamond core drill and the quartz glass around the time when a depth of the hole reached to 20 mm, thereby, a grinding speed was lowered and rotation of the diamond core drill was eventually stopped due to the loading. Then, a switch of the core drill processing machine was operated to turn off power supply, the diamond core drill was extracted from the quartz disk, the workpiece powder was removed and thereafter the processing was restarted. However, when the diamond core drill reached a depth of about 25 mm the drill was again stopped. The switch of the core drill processing machine was again operated to turn off power supply, the diamond core drill was extracted from the quartz glass disk, workpiece powder was removed and thereafter hole forming was restarted. Another two series of such special operations for removing workpiece powder from the fore-end part of the core drill were repeatedly to eventually complete the hole-forming after a long time elapsed from the start.

A time period required for the hole forming was about 100 min, which was longer than was in Example 18 by a factor of about 4. The quartz glass disk on which the processing was completed was observed after the soda lime glass sheet was separated off and as a result, large cracks and much of chipping were observed, which caused reduction in quality.

As described above, according to an outer-diameter blade and a cutting machine of the present invention, the following effects were achieved: cutting resistance to the blade during cutting can satisfactorily be decreased; chipping of a to-be-cut object is prevented from occuring which is caused by contact with the diamond blade due to warpage of the to-be-cut object, which is generated by cutting resistance which the blade receives during the cutting; a phenomenon of the diamond blade being turned aside when the cutting is finished is prevented from occurring; and a burr can be prevented from being generated.

Further, according to an inner-diameter blade and a cutting machine of the present invention, there can be enjoyed a further effect: cutting resistance during cutting can satisfactorily be reduced; thereby, the inner-diameter blade is prevented from being bent by receiving the cutting resistance during the cutting; and as a result, a curved cutting surface is prevented from being formed.

Further, according to a core drill and a core drill processing machine of the present invention, there can be enjoyed a still further effect, which is great: grinding powder and loosed-off abrasive grains that are loaded between the core drill and a workpiece are effectively removed constantly during all the cutting operation and not only a time period of grinding is shortened, but defects, such as cracks, indentations caused by chipping and the like, are perfectly prevented from occurring when the core drill passes through the workpiece on completion of the processing.

Obviously various minor changes and modifications of the present invention are possible in the light of the above teaching. It is therefore to be understood that within the scope of the appended claims the invention may be practiced otherwise than as specifically described.

What is claimed is:

1. An outer-diameter blade comprising:

a metal base plate having a disk-like shape;

a tip portion, which is provided along an outer peripheral part of the metal base plate, and whose abrasive grains are fixed to the outer peripheral part; and an abrasive grain layer, which is formed on a side surface of the metal base plate, whose abrasive grains are fixed on a side surface of the metal base plate inwardly from the tip portion;

wherein an outer end face of the tip portion is shaped as an angled protrusion and said abrasive grain layer is lower in a thickness direction of the metal base plate than a side part of the tip portion.

2. An outer-diameter blade according to claim 1, wherein abrasive grains included in the abrasive grain layer are finer in size than those included in the tip portion.

3. An outer-diameter blade according to claim 1, wherein the abrasive grain layer is formed on a part of a side surface of the metal base plate.

4. An outer-diameter blade according to claim 1, wherein the tip portion is constituted of diamond abrasive grains and/or CBN abrasive grains.

5. An outer-diameter blade according to claim 1, wherein the abrasive grain layer is constituted of diamond abrasive grains and/or one or more of other types of abrasive grains.

6. An outer-diameter blade according to claim 5, wherein the other types of abrasive grains are SiC, $Al_2O_3$, $ZrO_2$, $Si_3N_4$, CBN and/or BN.

7. An outer-diameter blade according to claim 1, wherein an apex angle of the angular protrusion at the outer end face of the tip portion is set in the range of 45° to 120°.

8. An outer-diameter blade cutting machine comprising:

an outer-diameter blade according to claim 1; and a rotation drive section for rotating the outer-diameter blade at a high speed.

* * * * *